United States Patent [19]

Effing

[11] Patent Number: 5,818,738

[45] Date of Patent: Oct. 6, 1998

[54] METHOD FOR TESTING THE AUTHENTICITY OF A DATA CARRIER HAVING AN INTEGRATED CIRCUIT

[75] Inventor: Wolfgang Effing, Gilching, Germany

[73] Assignee: Gao Gesellschaft fur Automation und Organisation MGH, Munich, Germany

[21] Appl. No.: 391,517

[22] PCT Filed: Oct. 18, 1988

[86] PCT No.: PCT/EP88/00932

§ 371 Date: Jun. 30, 1989

§ 102(e) Date: Jun. 30, 1989

[87] PCT Pub. No.: WO89/04022

PCT Pub. Date: May 5, 1989

[30]      Foreign Application Priority Data

Oct. 30, 1987  [DE]   Germany .......................... 37 36 882.6

[51] Int. Cl.⁶ .................................................. G01R 31/28
[52] U.S. Cl. ........................................... 364/579; 364/488
[58] Field of Search ..................... 364/579, 488

[56]             References Cited

U.S. PATENT DOCUMENTS

| | | | |
|---|---|---|---|
| 4,454,577 | 6/1984 | Costantini et al. | 364/579 |
| 4,523,087 | 6/1985 | Benton | 235/379 |
| 4,529,870 | 7/1985 | Chaum | 235/380 |
| 4,538,268 | 8/1985 | Pham Van Cang | 364/579 |
| 4,582,985 | 4/1986 | Löfberg | 235/380 |
| 4,630,224 | 12/1986 | Sollman | 364/579 |
| 4,783,801 | 11/1988 | Kaule | 380/3 |

FOREIGN PATENT DOCUMENTS

| | | |
|---|---|---|
| 0186038 | 12/1985 | European Pat. Off. . |
| 0186038 | 7/1986 | European Pat. Off. . |
| 2606199 | 5/1988 | European Pat. Off. . |
| 3347483 | 7/1985 | Germany . |

OTHER PUBLICATIONS

"A Behavioural Test Method for Microprocessors and Complex Circuits" by C Bellon et al, IEE European Conference on electronic Design Automation 26–30 Mar. 1984, pp. 79–82.

"Intelligent Assistance for Test Program Generation" by C. Bellon et al, IEE Europen Conference on Electronic Design Automation, 26–30 Mar. 1984, pp. 166–170.

"Optical Interconnections for VLSI Systems" by Goodman et al., IEEE 1984, Proceedings of IEEE, vol. 72, No. 7, Jul. 1984, pp. 850–866.

"Optical Imaging Applied to Microelectronic Chip–to Chip Interconnections" by Kostuk et al., Applied Optics, vol. 24, No. 17, Sep. 1985, pp. 2851–2858.

*Primary Examiner*—Vincent N. Trans
*Attorney, Agent, or Firm*—Watson Cole Stevens Davis, P.L.L.C.

[57]             ABSTRACT

A method for testing the authenticity of data carriers having integrated circuits, memory and logic means to determine physical properties of each circuit that are distinctive of this circuit and use them to obtain data characteristic of each circuit. According to the present invention, one preferably evaluates the different programming times of the memory cells of an $E^2PROM$ memory, an evaluation which can be determined by various methods and processed as distinctive characteristics. Other individual properties that can be utilized are, for example, distinctive features of a memory input.

62 Claims, 13 Drawing Sheets

TABLE 2

| Z | ΔZ | 1 | 2 | 3 | 4 | 5 | 6 | 7 | 8 |
|---|---|---|---|---|---|---|---|---|---|
| 74 | - | 0 | 0 | 0 | 0 | 1 | 0 | 0 | 0 |
| 76 | 2 | 0 | 0 | 0 | 0 | 1 | 0 | 1 | 0 |
| 85 | 9 | 0 | 0 | 1 | 0 | 1 | 0 | 1 | 0 |
| 89 | 4 | 0 | 0 | 1 | 1 | 1 | 0 | 1 | 0 |
| 90 | 1 | 0 | 0 | 1 | 1 | 1 | 1 | 1 | 0 |
| 95 | 5 | 1 | 0 | 1 | 1 | 1 | 1 | 1 | 0 |
| 100 | 5 | 1 | 1 | 1 | 1 | 1 | 1 | 1 | 0 |
| 116 | 16 | 1 | 1 | 1 | 1 | 1 | 1 | 1 | 1 |

TABLE 1

| Z | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| ... | | | | | | | | |
| 74 | 0 | 0 | 0 | 0 | 1 | 0 | 0 | 0 |
| 75 | 0 | 0 | 0 | 0 | 1 | 0 | 0 | 0 |
| 76 | 0 | 0 | 0 | 0 | 1 | 0 | 1 | 0 |
| ... | | | | | | | | |
| 85 | 0 | 1 | 1 | 0 | 1 | 0 | 1 | 0 |
| ... | | | | | | | | |

FIG. 8

| Z | ΔZ | 1 | 2 | 3 | 4 | 5 | 6 | 7 | 8 |
|---|----|---|---|---|---|---|---|---|---|
| 86 | / | 0 | 0 | 0 | 0 | 0 | 0 | 1 | 0 |
| 98 | 12 | 0 | 0 | 0 | 0 | 0 | 0 | 1 | 1 |
| 102 | 4 | 0 | 0 | 0 | 0 | 1 | 0 | 1 | 1 |
| 103 | 1 | 0 | 0 | 0 | 0 | 1 | 1 | 1 | 1 |
| 104 | 1 | 1 | 0 | 0 | 0 | 1 | 1 | 1 | 1 |
| 105 | 1 | 1 | 1 | 0 | 0 | 1 | 1 | 1 | 1 |
| 110 | 5 | 1 | 1 | 1 | 0 | 1 | 1 | 1 | 1 |
| 129 | 19 | 1 | 1 | 1 | 1 | 1 | 1 | 1 | 1 |

| Z | ΔZ | 1 | 2 | 3 | 4 | 5 | 6 | 7 | 8 |
|---|----|---|---|---|---|---|---|---|---|
| 103 | / | 0 | 0 | 0 | 0 | 0 | 0 | 1 | 0 |
| 105 | 2 | 0 | 0 | 0 | 0 | 0 | 1 | 1 | 0 |
| 107 | 2 | 0 | 0 | 0 | 0 | 0 | 1 | 1 | 1 |
| 108 | 1 | 0 | 0 | 1 | 0 | 0 | 1 | 1 | 1 |
| 109 | 1 | 0 | 0 | 1 | 1 | 0 | 1 | 1 | 1 |
| 110 | 1 | 0 | 0 | 1 | 1 | 1 | 1 | 1 | 1 |
| 128 | 18 | 0 | 1 | 1 | 1 | 1 | 1 | 1 | 1 |
| 138 | 10 | 1 | 1 | 1 | 1 | 1 | 1 | 1 | 1 |

METHOD FOR TESTING THE AUTHENTICITY OF A DATA CARRIER HAVING AN INTEGRATED CIRCUIT

BACKGROUND OF THE INVENTION

The present invention relates to a method for testing the authenticity of a data storage carrier having at least one integrated circuit with memory and logic means as well as elements for inputting and outputting data.

It has been known for some time to test the authenticity of data storage carriers, such as tokens of value negotiable instruments, or similar monetary products using an individual physical and machine-detectable property characteristic of each token.

One obtains a high security standard if the individual property or characteristic is a feature that can only be imitated with great technical effort. Such an individual physical property may, for example, be a quality that arises randomly during production due to manufacturing variations.

In this connection, German laid-open print no. 24 58 705 proposes measuring the color and print properties, the thickness of the applied ink, paper dimensions or paper properties as individual quantities of a token of value or bank note. The automatically, measured individual characteristic may be stored on the token in an encrypted form. During authenticity testing the individual quantity is measured again and tested for identity with the reference value determined in the first test and stored on the token.

According to another proposal (EP 112 461) it is also known to measure as an individual characteristic variances due to manufacturing tolerances. The specific property of a microwave antenna is stored in the identity card in this known proposal to allow for contactless operation of the integrated circuit. Electrically measurable quantities that are measured are, for example, the reflection properties specific to each antenna. The measured quantity is encrypted via a secret algorithm into a code number that is deposited as a reference value in the memory of the integrated circuit for subsequent authenticity testing.

In the proposed method, only a feature of a peripheral unit, the microwave antenna, is measured for determining the authenticity of a data carrier having an integrated circuit. The integrated circuit itself is not protected from manipulation via this feature. Above all, the method proposed here can only be used for those identity cards in which the dialog between the card and the test unit takes place in contactless fashion via appropriate coupling elements such as microwave antennas.

The majority of identity cards having integrated circuits that are used in practice today, and presumably also in the foreseeable future, are operated in contacting fashion using conventional galvanic contacting. This contacting method is definitely much easier to realize technically and less expensive.

SUMMARY OF THE INVENTION

The unsolved problem on which the invention is based is to propose a method for testing the authenticity of data storage carriers having integrated circuits which is more reliable when it comes to recognizing manipulations and can be used for virtually all data carriers having integrated circuits.

This problem is solved according to the claimed invention.

The invention is based on the surprising finding that, in spite of the perfectionism and constantly increasing miniaturization involved in IC production and the constantly improved quality and purity of the basic materials, the integrated circuit itself still allows for the possibility of detecting physical characteristics in terms of its "fine structure" which distinguish it clearly from circuits of the same type and with the same function. Thus, the circuit itself makes it possible to obtain individual data characteristic of every single circuit which meet the general conditions for use as authenticity features.

When selecting physical property to be used for authenticity testing, one must make sure the property has sufficient "individuality" in the "fine structure" of each chip due to the tolerances of production technology, the material, etc., can be detected by measurement technology with reasonable effort, is independent or can be isolated from external parameters such as temperature, and can be easily measured any number of times and in different places and compared with a measuring result obtained and recorded at an earlier time.

Since one or more individual properties of the integrated circuit itself are tested, a forger wanting to manipulate the test method must perform these manipulations on the chip itself, which—if he can realize the objective at all—requires a great deal of knowledge and technical skill in the field of chip technology.

The present invention shows not only that a circuit can be classified according to its type, layout, etc., to attain protection from simulator circuits, but also shows that one can determine individual physical qualities which result mainly from manufacturing variations during production of the circuit and characterize every single circuit individually. Such characteristics are generally impossible to imitate, even for a forger having the corresponding knowledge and skill in chip technology.

A particularly advantageous individual quantity of a circuit for proving the authenticity thereof is, for example, the different minimum programming time required in an $E^2PROM$ memory for individual memory cells. This example, which is especially easy to explain, shall serve to illustrate in detail the invention together with the corresponding measurement and testing technique for determining the authenticity of circuits.

These $E^2PROM$ memories are used increasingly—a trend that will presumably continue—in the majority of data carriers having integrated circuits in use today. They are nonvolatile, electrically multiprogrammable and—erasable memories.

An essential feature of a $E^2PROM$ memory cell is that it has a charge zone electrically isolated from its surroundings by a thin insulating layer, whereby the "tunnel effect" can be utilized to apply electric charges to said zone through the insulating layer, store them there and remove them again.

The insulating layers of the individual memory cells of an integrated circuit vary randomly within a certain range, due, for example, to manufacturing tolerances in the thickness of the various layers and the quality or purity of the material, the homogeneity and amount of doping in the semiconductor material, etc. Since even small changes in these parameters noticeably affect the strength of the tunnel current, there is some variation in the times necessary for switching a memory cell from the programmed to the erased state and vice versa.

In practice one therefore lays down a programming time that must always be observed which is typically oriented toward the longest programming times required. It is thus long enough that all cells to be changed will definitely be charged or erased within this period.

However, if one programs a memory row (also called a "memory word") consisting, for example, of eight memory cells simultaneously from logic "0" to logic "1" and observes during the programming process the chronological order in which the cells switch from "0" to "1", and possibly also the skew times between them, one obtains an individual "switching pattern" typical of each memory word.

It has surprisingly been shown that each memory word has its own switching pattern and that this switching pattern, characteristic of each individual memory word (memory row), always comes about in the same form during every programming process.

The switching pattern is thus an individual feature of a circuit that not only varies randomly from memory word to memory word, and of course also from circuit to circuit, but is also exactly reproducible using simple measurement technology.

Due to these facts, this feature is excellently suited for determining the authenticity or integrated circuits.

Another individual physical quantity of an integrated circuit that can be used as authenticity features is, for example, the static or dynamic input characteristic, which varies greatly from circuit to circuit, in particular in the breakdown range, and thus constitutes a feature characteristic of the circuit. Data lines, e.g. a bus line, in integrated circuits of the same type and design, one can also detect, with sufficient resolution, individually different delays which are based on differences in the fine structure of the chip. These differences can be detected to obtain individual characteristics by absolute measurement of the delay. However, it is simpler in terms of measurement technology to assign a piece of information simultaneously to a bus line designed for parallel operation and including several (8 or 16) bits. By relative measurement of the delays varying from bit to bit, i.e. from line to line, one can determine the delay profile characteristic of each bus line. Here, too, the manufacturing tolerances in the circuit will result in a delay profile which is characteristic and unalterable for the circuit.

According to a further embodiment of the invention, however, it is also possible to scan the surface structure of the chip, whereby in the case of unpolished chips the back surface strongly structured by the sawing process can be used for this purpose.

Alongside these exemplary embodiments that make use of random, unalterable, unique features arising through the production process, it is also possible to deliberately introduce random structures onto or into the integrated circuit which, once they are applied, cannot be imitated in an identical form and can thus also be used as individual features of particular circuits. Such a feature is, for example, a metal coating with a random surface structure located in or on the chip. Via a resistance measurement, preferably at several places, the surface structure can then be "read out."

The inventive solution offers the possibility of applying the method of authenticity testing in almost all technical and commercial areas in which chip cards are used. The area in which the data storage carrier is used generally also determines how much effort is financially reasonable for testing the authenticity feature. The feature is therefore generally selected with a view to the testing effort necessary for this purpose and the particular security level required. The present invention makes it possible to use the appropriate memory, control and logic means of an integrated circuit to obtain a great number of variations not only in terms of the individual feature selected, but also in terms of its evaluation. One can thus select and evaluate a specially adapted individual feature depending on the data carrier's particular area of application and the necessary security level.

The individual characteristics proving the authenticity of the integrated circuit can be stored in an encrypted or an unencrypted form, depending on the application, in the chip itself or else outside the carrier, e.g. in a host. During authenticity testing the data can then be compared in the chip itself, in the terminal or in the host. It is also possible to bind the chip to its carrier, i.e. to the card, by storing these characteristics on the card in a card-specific form. One can make the authenticity of both the card and the chip clearly detectable by, for example, linking the data characterizing the chip with authenticity characteristics of the card and or storing them jointly.

There are also various possibilities as to how to use this authenticity feature for the chip in the system, for example processing it into a key number that the user must input with every use of the card, or using it as a key for encrypting other data, e.g. card data or data of the integrated circuit, etc.

In a preferred embodiment, the data storage carrier having an integrated circuit, preferably in the form of a microprocessor with connected memory units, is itself provided with the measuring means for determining these individual characteristics, as well as with encryption means and possibly also a means for combining the determined characteristics with other electronically stored data to form a key. The microprocessor, measuring means, encryption means, key forming means and memory are preferably all integrated onto an IC module (chip).

The characteristics determined by the internal measuring means can preferably be outputted in clear text only during initialization, i.e. before the chip, or the card containing the chips, is issued to the user, and stored in a protected environment (host) as an unalterable, inimitable "serial number" for later testings. For this purpose the chip is designed, in terms of the card and/or software side, in such a way that this data output can only be performed in one unique operation and the characteristics are thereafter available only internally for forming a key or for encryption. For example, the output line for these data can be provided with an internal fuse which is interrupted irreversibly after transmission of the data.

This initialization can involve not only the registration of the individual characteristics but also the loading of the necessary encrypting programs, keys or key fragments and also data (card data, etc.) into the memory of the card. During personalization—a second process possibly independent of the initialization process—the card owner's data are then added to the memories and the individual characteristics stored in the host are assigned to the particular owner. If it disposes or the corresponding keys, this card can then be tested for system affiliation and authenticity on-line, off-line or optionally on- or off-line.

According to an embodiment for on-line authenticity testing, the card having an integrated measuring means and encryption means is additionally loaded with a key which is e.g. different for all cards or uniform for all cards of a system, an institution, a bank, etc. In a transaction, during which the authenticity of the card is to be tested, this key is used to encrypt the characteristics determined in the chip and the encrypted data are sent via a line to the host. The host, which also disposes of this key, can then decrypt these data and compare them with the characteristics stored there for the associated card.

To prevent the encryption result from being the same in every transaction, one preferably also includes in the encryption variable data, e.g. a random number sent by the host, the time of day and/or transaction data.

Analogously, the card can also send to the mainframe a random number for encryption to make sure the dialog partner is authentic.

Since these characteristics are generally random data obtained from manufacturing tolerances, which may change within certain limits in the course of time, deviations up to a predetermined extent are accepted during testing of the data. Methods for detecting similarity in two data sets are well-known, e.g. in the form of various correlation methods. If changes in time are ascertained, this can be registered for the subsequent testings, for example by having the stored characteristic set brought up to date in the mainframe.

Another use of these individual characteristics in an authenticity testing and/or identification system is as input data for forming a key. However, in this case it is necessary for the characteristics to be measurable in exactly reproducible fashion and, if possible, not subject to any changes in time that can ultimately not be corrected. If only one bit is changed in the characteristic set or the keys formed therefrom, this will already lead to a completely different encryption result. Identity of the characteristics can be obtained for example, if the programming times of $E^2PROM$ cells serve as characteristics, by appropriate preselection of the cells to be evaluated or else by additional stored check digits which allow for a certain subsequent correction of the measured values to the given value. By additional electronic storage of the characteristics determined during initialization in an memory area inaccessible from the outside, identity could be ascertained in a pretest.

In a preferred embodiment, these individual characteristics are combined with a value (offset) electronically stored in the chip to form a key which is then used to encrypt any data. This offset, which is generated during initialization of the card and stored in the chip, is preferably selected in such a way that, after combination with the characteristics, a key is obtained that is the same for a plurality of cards, e.g. all cards of one bank or credit institution. These one or more keys are then installed in one or more authorization mainframes or in the transaction terminals (money dispensing machines, POS terminals, etc.) so that the card and the mainframe or terminals can preferably identify each other by mutually exchanging encrypted data (handshaking method). Since this authenticity testing involves the use of "global" keys instead of resorting to the characteristics stored in the mainframe, this method is particularly suitable for off-line testing.

For encrypting the data one can use known algorithms, such as the DES algorithm, or public key algorithms (see Meyer, Matyas "Cryptography: A new dimension in computer data security", John Viley & Sons, New York, 1982, pp.141–165; Rivest Shamir, Adelman "A method for obtaining digital signatures and public key cryptosystems" Communication of the ACM, 21, No. 2, 120–126, 1978).

In the following description of preferred embodiments, examples for application are shown using public key algorithms.

The use of these individual characteristics of the chip as input parameters for an encryption or a key formation has in particular the advantage that, even if an outsider should somehow be able to read out in terms of hardware or software the content of the memory of the chip, he still fails to acquire all necessary information for being able to duplicate a card. In order to obtain the information to be encrypted or the entire key information, he must additionally spy out the system for forming the individual characteristics, i.e. he must find out the type of the particular characteristic system ($E^2PROM$ cells, bus lines, etc.) and how to measure, evaluate and convert the characteristics for further processing.

A mere chip analysis which, technically, is aimed only at determining the electronically stored data thus leads to no success in the case of the inventively operating systems due to the "storage" of part of the secret information in a manner that is technically completely different from normal electronic storage.

BRIEF DESCRIPTION OF THE DRAWINGS

Further advantages and advantageous developments can be found in the description of the invention with reference to the figures, in which FIG. 8 shows tabular synopses of the measuring results.

DESCRIPTION OF THE PREFERRED EMBODIMENTS

Figure 1:
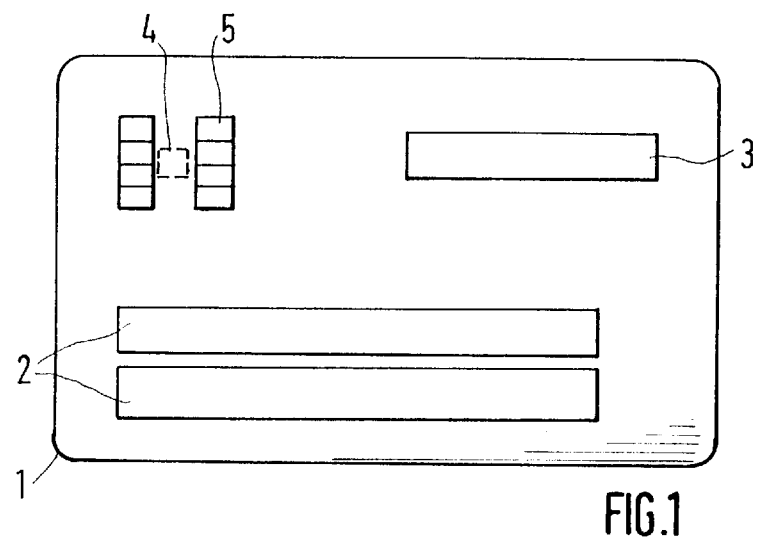
FIG. 1 shows an identity card having an integrated circuit.

FIG. 1 shows a schematic view of an identity card 1, as used for example in cashless transfers, as an entitlement card for entering premises or installations, or as proof of identity. The card generally has the user-related data in fields 2, such as the card owner's name, the customer's number, etc., and e.g. a serial card number. Field 3 has printed on, for example, the data on the card-issuing institution. This card additionally has an IC chip 4 embedded inside the card (shown by broken lines) which can be electrically connected via contact surfaces 5 with external peripheral devices (test devices). This integrated circuit contains control and processing circuits and one or more memories, the latter being mainly memories of the $E^2PROM$ type, i.e. nonvolatile, electrically multiprogrammable and erasable memories.

According to a preferred embodiment of the invention, the programming time varying from memory cell to memory cell is determined to produce data characterizing each individual chip, and these data are processed and stored as individual authenticity characteristics. It is not necessary to keep certain memory areas free for this determination of the characteristics. One can use any occupied or not yet occupied areas, whereby the memory content must be temporarily stored elsewhere for this time of characteristic determination only for the evaluation of already occupied areas. The technological and physical background and the measuring and evaluation methods shall be explained in more detail in the following.

Figure 2:
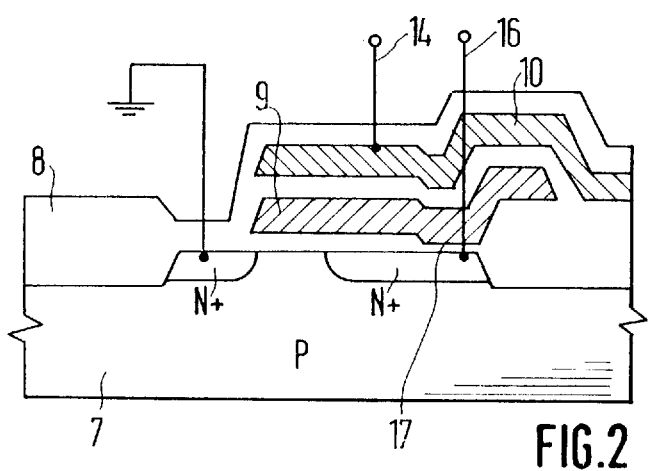
FIG. 2 shows the cross-sectional view of an $E^2PROM$ cell.

FIG. 2 shows a cross-sectional view of an E²PROM cell 6 of the floating gate type. With this type, silicon base layer 7 with its differently doped areas (P, N⁺) bears above it an electrically conductive layer area separated by an oxide layer 8, the so-called floating gate. This floating gate is superimposed by a further conductive layer 10, the top or control gate, which, unlike the floating gate, can be directly driven electrically. During the write or erase operation, when a correspondingly poled voltage difference is built up between top or control gate 10 and the N⁺ area, electrons tunnel from this N⁺ area into the floating gate and are stored there. In the case of opposite polarity, electrons are accordingly withdrawn from the floating gate ("erase operation"). The tunneling can be described by the Fowler-Nordheim mechanism. In order to minimize the probability of the electrons stored on the floating gate being able to leak away due to large lattice defects or other disturbances, thereby discharging the memory cell, the insulating layer separating the floating gate from the N⁺ area is kept in a small area 17 so slight that tunneling is possible. Reducing the effective tunnel area reduces the probability of large lattice defects existing in this region.

Not only floating gate type E²PROM memories can be used, as in this example, but also other types or E²PROM memories, such as the MNOS type, which is also used, and basically differs from the floating gate type in that the electrons are stored in a nonconductive substance.

Figure 3A:
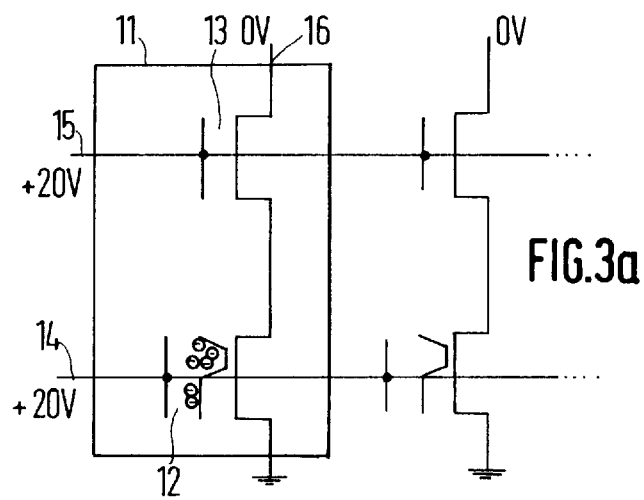
FIGS. 3a to c show the circuit diagrams of an $E^2PROM$ cell in the various phases write (a), erase (b), read (c)
Figure 3B:
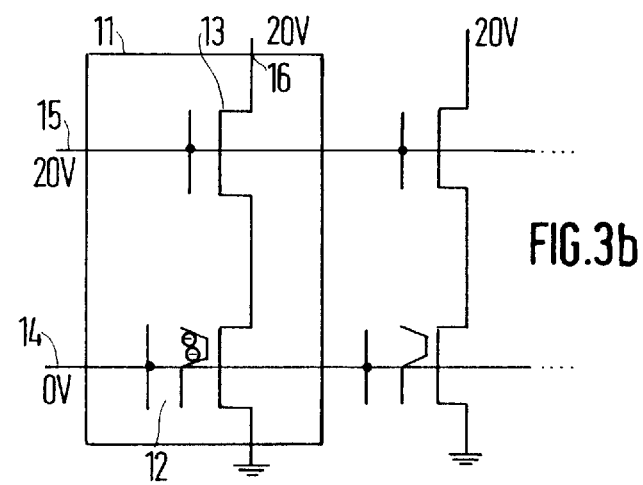
Figure 3C:
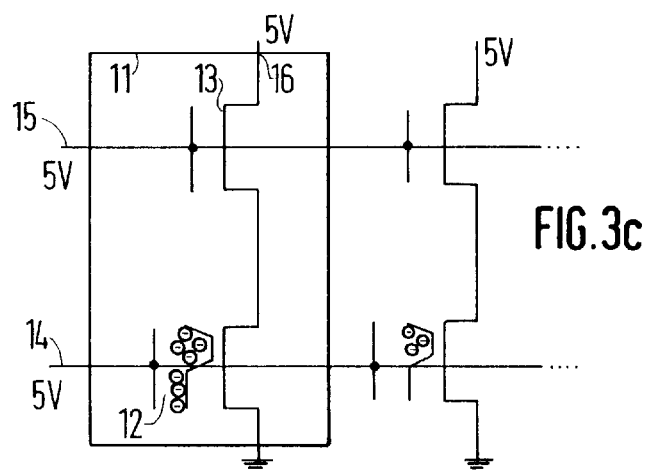

FIGS. 3a to c show the basic circuit diagram of an E²PROM cell in the various switching phases: write, erase and read. In order to allow for selective driving of each E²PROM cell 11, this cell contains not only actual memory transistor 12 but also a selection transistor 13. The circuitry of these transistors is shown in FIGS. 3.

The write operation (FIG. 3a):

In the write operation, programming voltage $U_{pp}$, which is generally ≈20 V, is applied to programming line 14 which goes to the top or control gate of the charging transistor. The same voltage is applied to selection line 15 which drives the corresponding memory word and opens the selection transistor, while voltage 0 is applied to line 16 defining the column. Due to these voltage differences in the memory transistor, electrons tunnel to this floating gate and are stored there. When an appropriate number of electrons is reached on this floating gate, this transistor is nonconductive.

The erase operation (FIG. 3b):

In the erase operation, the voltage polarities are reversed accordingly, i.e. a voltage or 0 V is applied to programming line 14 while a voltage of 20 V is applied to line 16 defining the column. Due to the antipolar voltage difference the electrons now tunnel from this floating gate to the adjacent N⁺ area.

The read operation (FIG. 3c):

In the read operation a voltage of e.g. 5 V is applied to all lines (programming line, selection line and the line defining the column) and the state of the transistor, conductive or nonconductive, is detected via appropriate auxiliary elements (not shown).

The effective programming time for each cell, i.e. the time required for bringing the necessary number of electrons to the floating gate or having them leak off it to cut off or open the transistor, is dependent on the thickness of the insulating layer, its area, its internal structure, etc., whereby the latter determines, among other things, the barrier's potential curve affecting the tunnel current. Since these quantities vary from cell to cell due to unavoidable manufacturing tolerances and inhomogeneities in the material, this effective programming time also varies from cell to cell. These different programming times can be detected by performing the programming process in clocked fashion, for example, and checking the particular cell state between the clock pulses.

Figure 4A:
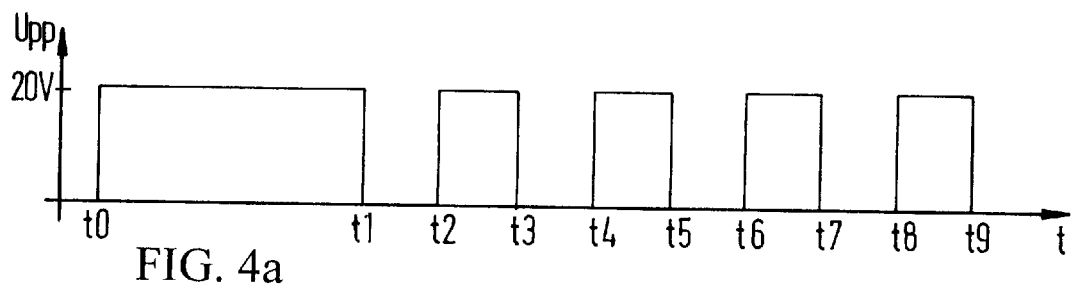
FIGS. 4a to f show various diagrams with the time slope of the charging phase of $E^2PROM$ cells according to the inventive method.

FIG. 4a shows a schematic view of an appropriate procedure for doing this. Programming voltage $U_{pp}$ is plotted here against time. Since all cells require a certain minimum programming time, a relatively long programming pulse can initially take place between times $t_0$ and $t_1$. When this "lead time" is over, the programming is interrupted in the time period between $t_1$ and $t_2$ and then continued with short programming pulses.

Figure 4B:
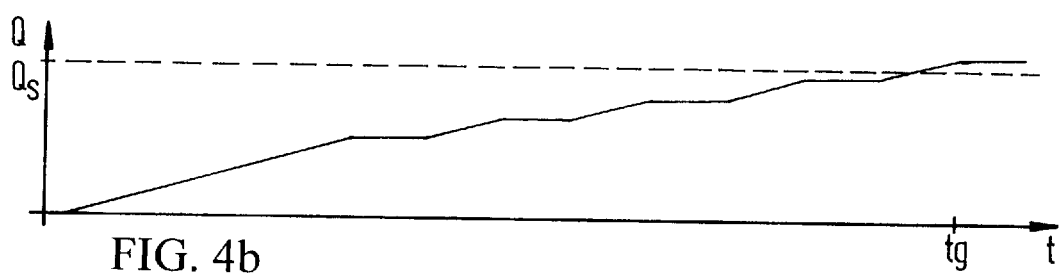

FIG. 4b shows, parallel thereto, the time slope of the state of charge of a first selected cell, again in a highly schematic form. The state of charge increases when the programming voltage is applied and has here exceeded after time $t_9$ the threshold that determines the conductive or nonconductive state of the charging transistor. The slope of this curve is dependent on the size of the tunnel current which is affected, as already mentioned, by parameters such as the thickness of the oxide layer, purity, effective tunnel area, etc.

Figure 4C:
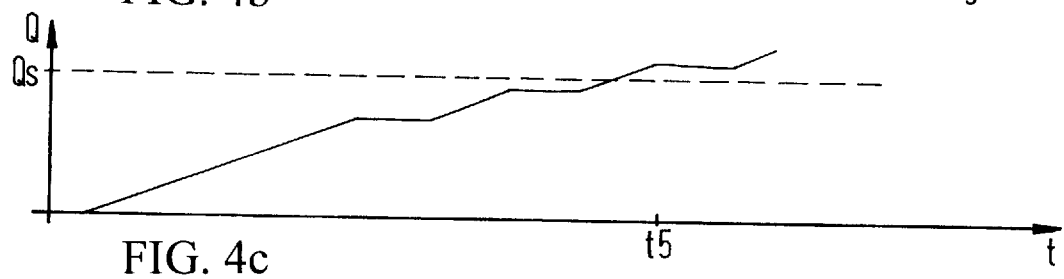

FIG. 4c analogously shows the state of charge of a second cell as a function of time. This cell already reaches threshold value $Q_s$ at time $t_5$. Due to manufacturing tolerances, different structural features of the material and of this cell, etc., the tunnel current is greater here and the state of charge is thus reached earlier. In order to detect the various times at which the cells of a memory row flip, one detects the particular state of the memory cell between the individual programming pulses.

Figure 4D:
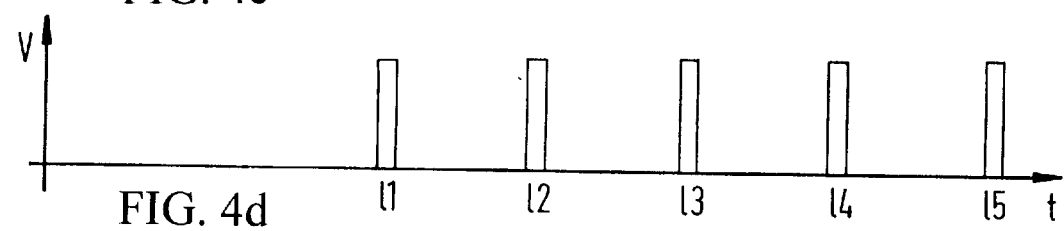

As shown in FIG. 4d, the memory row is read out at times $l_1$, $l_2$, etc., these times being in the programming pulse intervals.

Figure 4E:
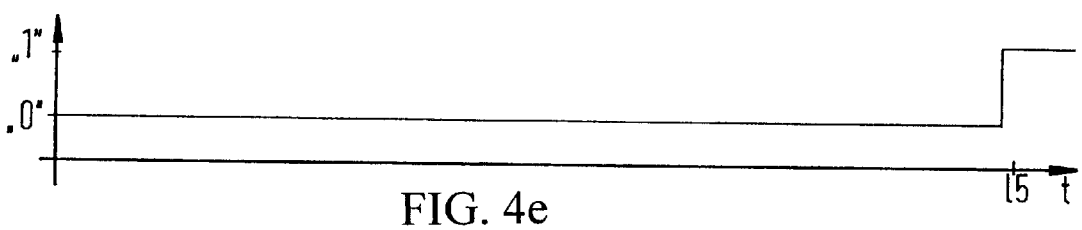
Figure 4F:
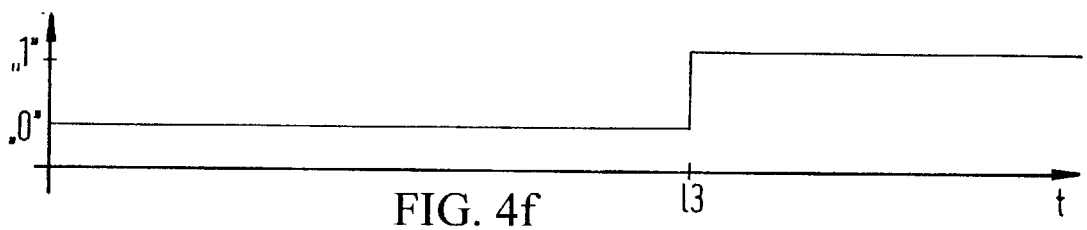
Figure 5:
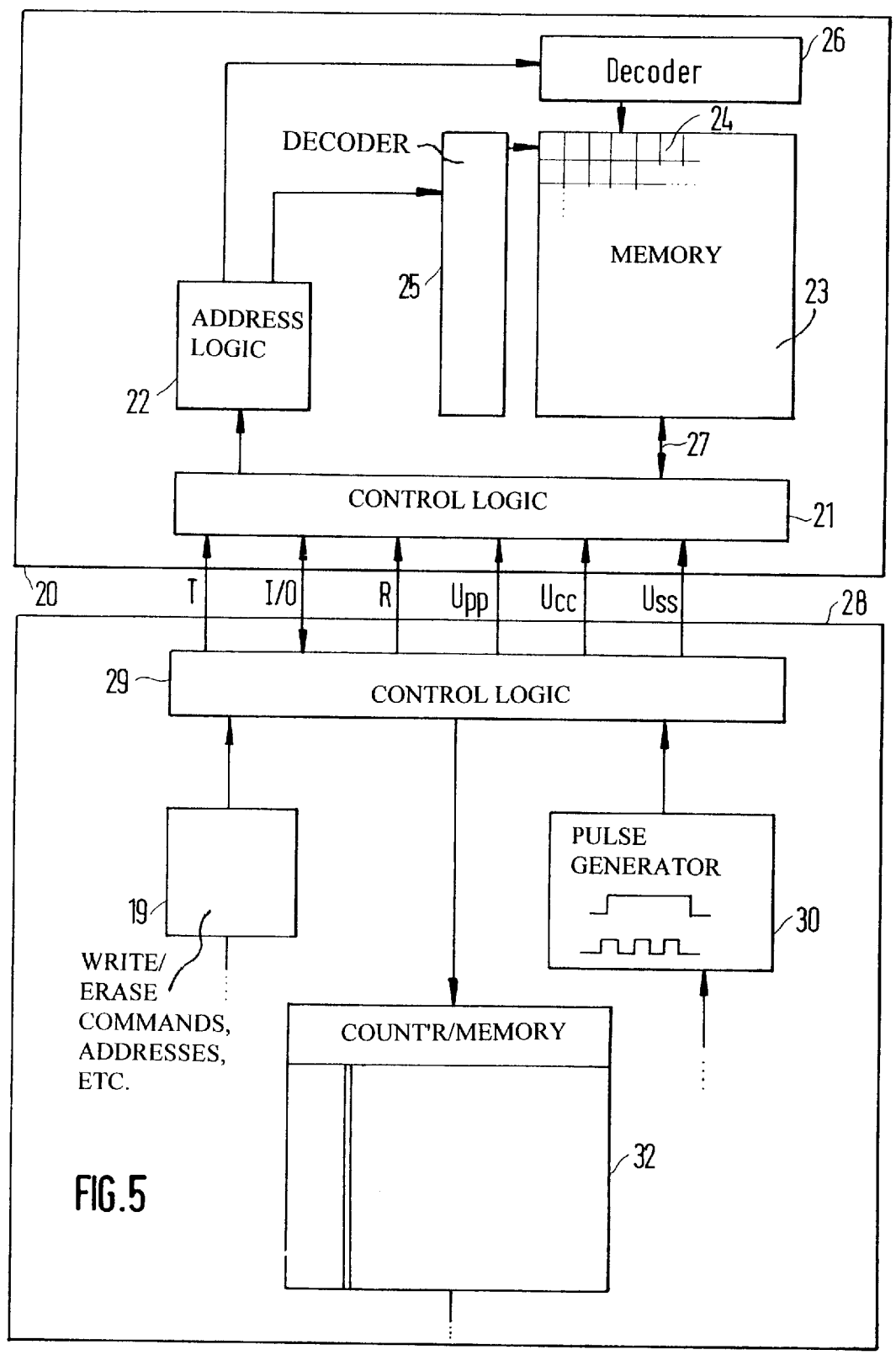
FIG. 5 shows a schematic view of a block diagram for measuring the different programming times.

FIG. 4e then shows that in the first memory cell a logical "1" is reported only at read time $l_5$, while the second cell already displays logical "1" at read time $l_3$ (FIG. 4f).

For simplicity's sake, only a few programming and read pulses are shown in this highly schematic representation. In reality, the total programming time, which is about 10 to 50 ms for E²PROM cells, will be divided into preferably 100 to 200 programming pulses to make it possible to detect the switchover times or the individual cells with the necessary resolution.

Figure 6:
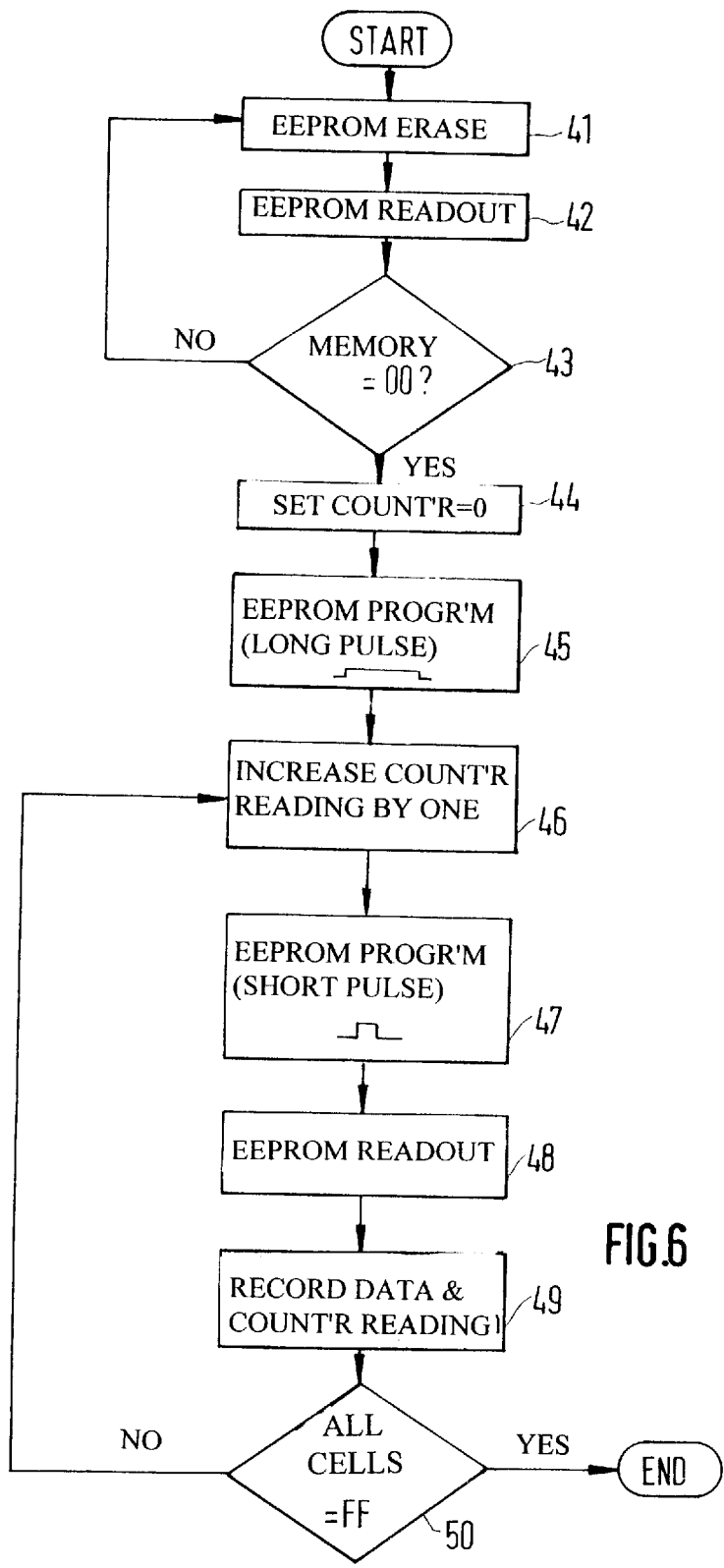
FIG. 6 shows a diagram of the process sequence of FIG. 5, FIGS. 7a to c show graphic representations of the measuring results.

FIG. 6 shows the block diagram of the card and the peripheral device with the units necessary for the measuring operation. Card unit 20 has a control logic 21 followed by an addressing logic 22 for selectively driving individual memory cells 24 of memory 23. The drive takes place via appropriate decoders 25, 26 which determine the particular row or column of the memory array to be addressed. Via a data line 27 the data are inputted to or read out or the memory by the control logic.

The card shown here has e.g. six external connections T (clock), I/O (data input/output), R (reset), $U_{pp}$ (programming voltage), $U_{cc}$ (supply voltage), $U_{ss}$ (ground). In some cards programming voltage $U_{pp}$ is generated internally, so that an external supply is superfluous.

These external connections are connected with control logic 29 of the peripheral or test device 28. Via this control logic the commands and data coming from other units 19 (write/ erase commands, addresses, etc.) are passed on to the card. The peripheral device also has a pulse generator 30 for generating write and erase pulses which are in turn programmable in their length. Finally, the peripheral device has a counter and memory unit 32 in which the data read out from the card are logged.

FIG. 6 shows the chronological sequence for measurement in the form of a flowchart. At the beginning of the process, the memory cells to be evaluated are first erased (41). The erase operation is checked by another readout (42) and if the memory was not erased to the necessary extent the erase operation is repeated (43). Otherwise, the counter located in unit 32 is charged with 0 (44) and the memory cell first preprogrammed with a relatively long-lasting programming pulse (45). The duration of this preprogramming pulse is such that it is insufficient for flipping the memory cells in this row. This can be checked in a subsequent step by another readout of the memory cell and the actually read signal, coupled with counter reading 0, recorded in the memory of unit 32. In the following step the counter reading is increased by one (46) and the programming process continued for a short time period (47). Following this short programming pulse the memory cell is read out again (48) and the data content together with the current counter reading recorded in memory unit 32 (49). Steps 46 to 49 are repeated until all memory cells reach the new state (=state of charge) (50). The data obtained from this measuring process can be represented, for example, in tables.

FIG. 8 shows tables of the measuring results obtained during the inventive evaluation of an $E^2$PROM memory row. Table 1 shows the counter readings in the first column and then the data content of the memory row in question read out at this counter reading. The eight positions correspond to the eight memory cells of this memory row, also called a word. The table shows that up to counter reading 73 there was no reprogramming, and only at the 74th run, i.e. at counter reading 74, did the fourth memory cell switch to logic "1". After two more runs, memory cell 6 flipped at counter reading 76. In this way the switchover time is registered for each memory cell. Since only the data records are of interest at which a change in the memory state actually took place, this table can be condensed either directly or subsequently.

Table 2 or FIG. 8 shows a condensed data logging. It registers only the counter readings at which one of the memory cells flips. Not only the current memory content is listed but also, in another column, the difference between the counter readings at which flipping took place. For the memory word evaluated here, flipping thus took place at counter readings 74, 76, 85, 89, 95, 100 and 116, whereby the memory cells (1 to 8) of this memory word flipped in the following order: 5, 7, 3, 4, 6, 1, 2, 8.

Figure 7A:
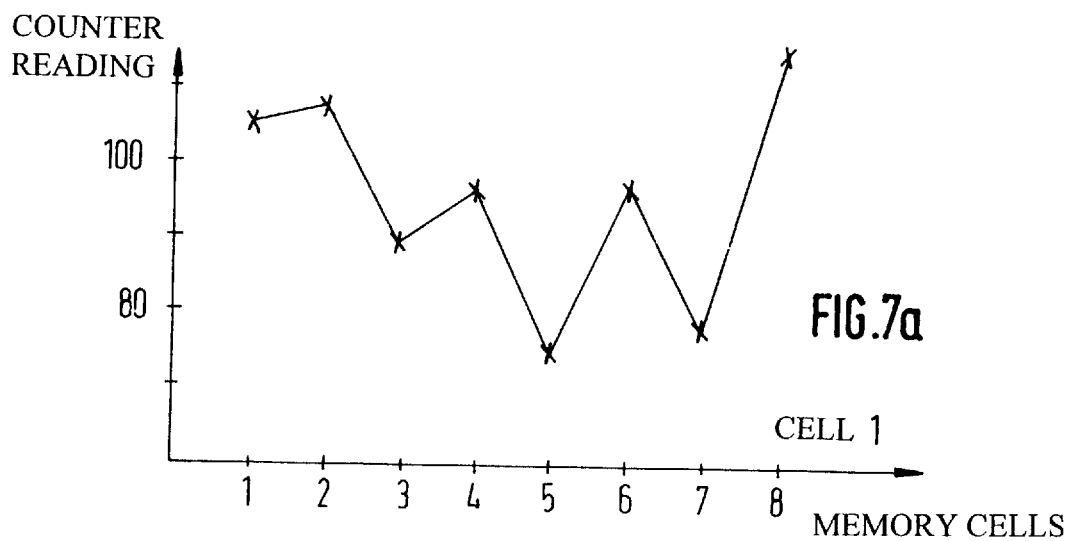

FIG. 7a shows a graphic representation of this measuring result, memory cells 1 to 8 being recorded on the abscissa and the counter reading at which the particular memory cell was reprogrammed being recorded on the ordinate. This "switching pattern" is a circuit diagram characteristic of each memory word and varies from word to word but retains its distinctive circuit diagram with each new programming process.

It is thus a typical feature that characterizes each memory word and whose basic statement cannot be affected from the outside. Since environmental parameters such as temperature affect all cells to the same extent, these parameters lead only to an overall shift in the ordinate level and possibly to a compression or stretching of the course of the curve, but cannot alter the distinctive profile.

Figure 7B:
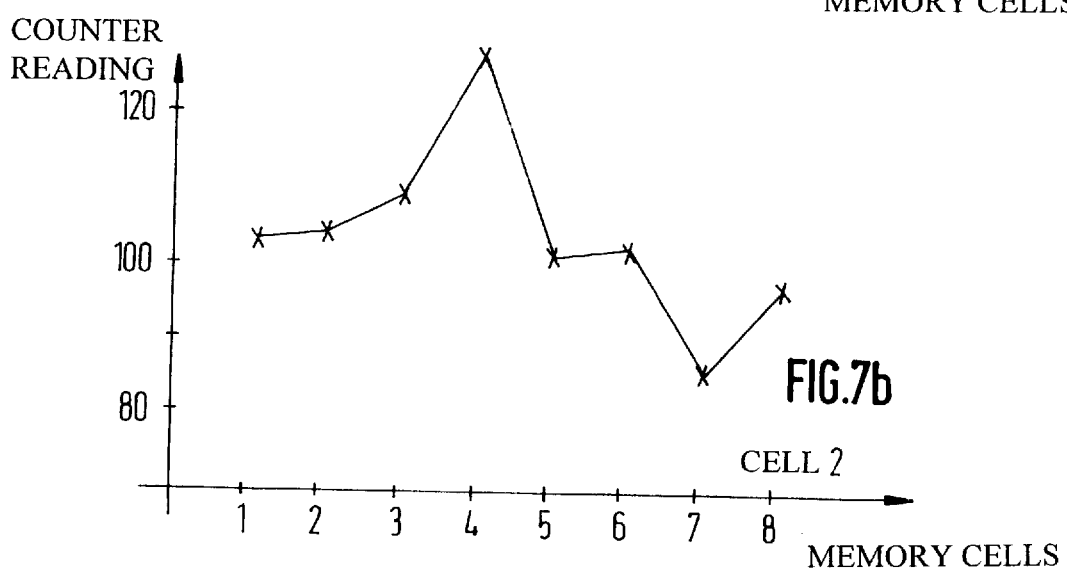
Figure 7C:
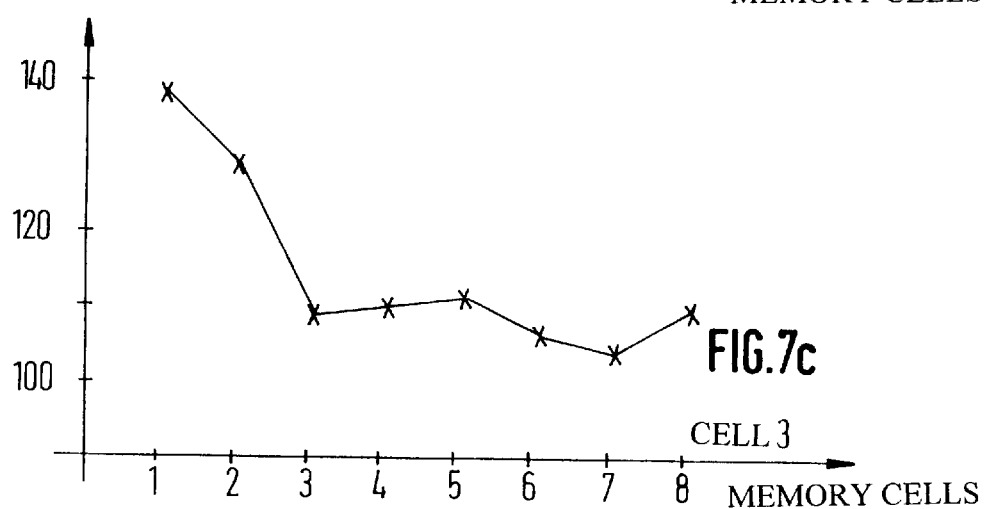
Figures 9, 9A:
FIGS. 9 and 9a show other tabular synopses of measuring results.

FIGS. 7b and c show these distinctive switching patterns for two other memory cells. The measured data for these memory cells are summarized in the tables shown in FIGS. 9 and 9a.

For subsequent authenticity testing of the memory, characteristics of these circuit diagrams are stored, there being different ways of doing this depending on the application. Thus, it may be sufficient to note the chronological order of switchover of the memory cells in a row. For the memory cell shown in Table 1 or FIG. 7a, as mentioned above, this would be the numerical sequence 5, 7, 3, 4, 6, 1, 2, 8. On the other hand, one can register the skew times in addition to this numerical sequence. This would yield the following series for the stated example:

(5, 0); (7, 2); (3, 9); (4, 4); (6, 1); (1, 6); (2, 6); (8, 16), the first number of each pair referring to the memory cell and the second number stating the difference compared to the preceding reprogramming process. Since the counter readings or these differences can, as already mentioned, shift as a whole when measured at different times due to environmental influences such as a change in the ambient temperature, one can eliminate these shifts by taking appropriate steps (quotient formation, scaling, etc.) when processing the data or performing the comparison. Using known correlation calculations, for example, one can clearly detect the similarity of the currently measured switching pattern with the stored switching pattern.

A further distinctive feature of an $E^2$PROM memory is, for example, the registration of memory cells, preferably of a plurality of memory words, which flip almost simultaneously. For the memory rows shown in FIG. 8 or 9, 9a for example, these would be cells 4 and 6 for the first memory word, cells 1, 2, 6 of the second memory word and cells 3, 4 and 5 of the third memory word.

Depending on the application one can thus register certain characteristics, whereby one must of course register the address of the memory cells to be evaluated along with these characteristics. Since the memory itself includes a great number of memory rows, the selection of which memory cells is used for determining authenticity can be made either arbitrarily or according to a secret key, so that outsiders cannot find out which of the memory cells is to be evaluated for determining authenticity. The selection can also be made in terms of the switching pattern of the memory rows, so that e.g. only those memory rows having a clearly structured switching pattern are evaluated, while other memory rows in which the memory cells all flip within a very brief time period are excluded from this selection.

If one notes e.g. only the chronological order of switchover, one must make sure that two cells that flip almost simultaneously can reverse their order during a repeated measurement. If only due to the tolerances in the reading voltage, the memory cell may be rated conductive on one occasion and nonconductive on another.

According to another measuring technique, one first determines the average programming time required for reprogramming about half of all memory cells of a memory word. If one reads out the memory content after this "half" of the programming time, the memory content has a value typical of this word. For the memory word with the switching pattern as shown in FIG. 7a, this average programming time would correspond approximately to the time of 95 clock pulses. If this memory word is charged after being discharged for this time period, which now does not need to be clocked, the subsequent readout of the memory word yields the following binary information: 1, 1, 0, 1, 0, 1, 0, 1, i.e. memory cells 1, 2, 4, 6 and 8 have flipped while memory cells 3, 5 and 7 still have their original state. If one reduces or increases the reading voltage, one can additionally detect that memory cells 4 and 6 are just in the cutoff area since they will report the conductive or nonconductive state of the memory transistor depending on the reading voltage.

The method presented here for evaluating the programming time of individual E$^2$PROM memory words has in particular the advantage that no analog data need to be processed and the dialog between the test device and the chip can take place via the external connection lines that already exist. One therefore requires no additional devices for optical scanning, for example. This is thus an easy measuring technique for determining an individual property of an integrated circuit, that identifies each circuit in an unalterable and unambiguous fashion.

In the following examples of the system shall be given in which the card can be tested for authenticity in on-line and/or off-line operation with inclusion of individual characteristics of the integrated circuit.

Figure 10:
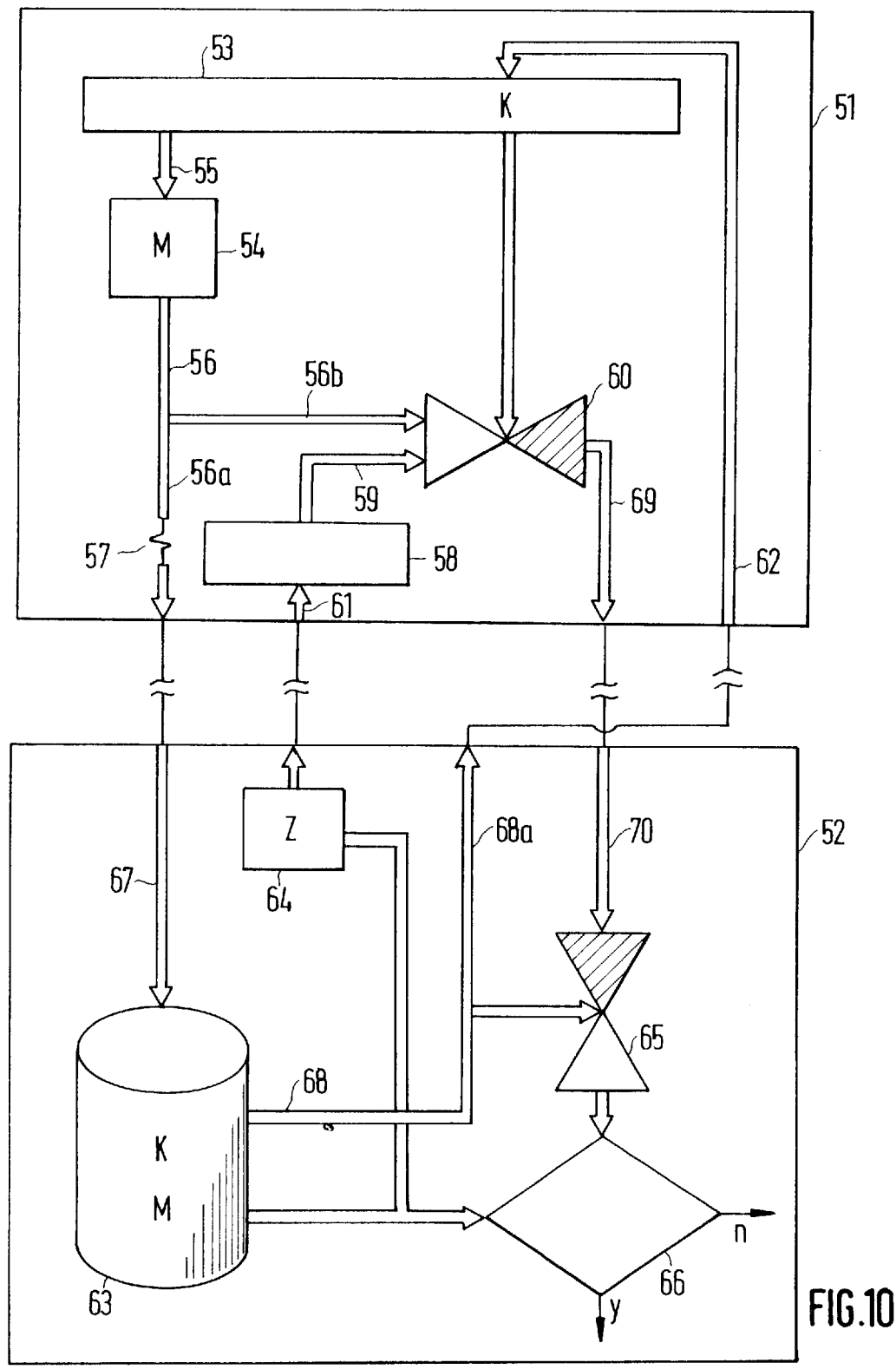
FIG. 10 shows a schematic view of the inventive system components, card and mainframe, in the initialization phase for on-line authenticity testing.

FIG. 10 shows schematically the important elements of a card 51, or the circuit of a card 51, which is connected for its initialization to a host 52.

The card contains a memory 53 comprising an outwardly accessible area and an inaccessible area for storing confidential information, keys, etc. The card also has a measuring circuit 54 for determining the individual characteristics, such as the programming times of E$^2$PROM cells of memory 53. Measuring circuit 54 is connected for this purpose to memory 53 and can additionally have means for processing the measured data, testing them internally, etc. Via a control circuit not shown in FIG. 10, this measuring circuit 54 can also be programmed to select certain E$^2$PROM cells to be evaluated. A line 56–56a leads from the measuring circuit to the output, line 56a containing a subsequently destructible fuse 57. This fuse can also be replaced by setting an appropriate protection bit in an externally inaccessible and unalterable memory that checks the output of the characteristics and in particular prevents it after the initialization process. Such means are basically known e.g. from German "Auslegeschrift" no. 11 14 049. A second line 56–56b leads to an encryption means 60 also located in the card. A further element of the card is a register 58 which is also connected via a line 59 to encryption unit 60. A first external access line 61 leads to this register 58, a second 62 to data memory 53. All above-mentioned electronic units are preferably components of an integrated circuit unit.

The host has a main memory 63, a random number generator 64, an encryption unit 65 and a comparator 66.

During initialization of the card, individual characteristics M, e.g. the individually different programming times of certain E$^2$PROM memory cells, are determined by measuring means 54 and transmitted via line 56–56a to the host linked with the chip card. There, characteristics M are transmitted via line 67 to the main memory and stored in a protected environment. During this initialization. which may be performed simultaneously with the personalization or the card when the user-related data and the programs required for use are stored in the card, a key K is simultaneously transmitted from the host to the memory of the card. The key is transmitted via a protected line 68-68a-62 to the card memory. This key K, serves later to protect the communication between the card and the host. After the initialization process, line 56a is interrupted in the card by igniting fuse 57, so that the characteristics obtained by measuring means 54 can only reach encryption unit 60 via line 56b and can no longer be fetched externally.

Figure 11:
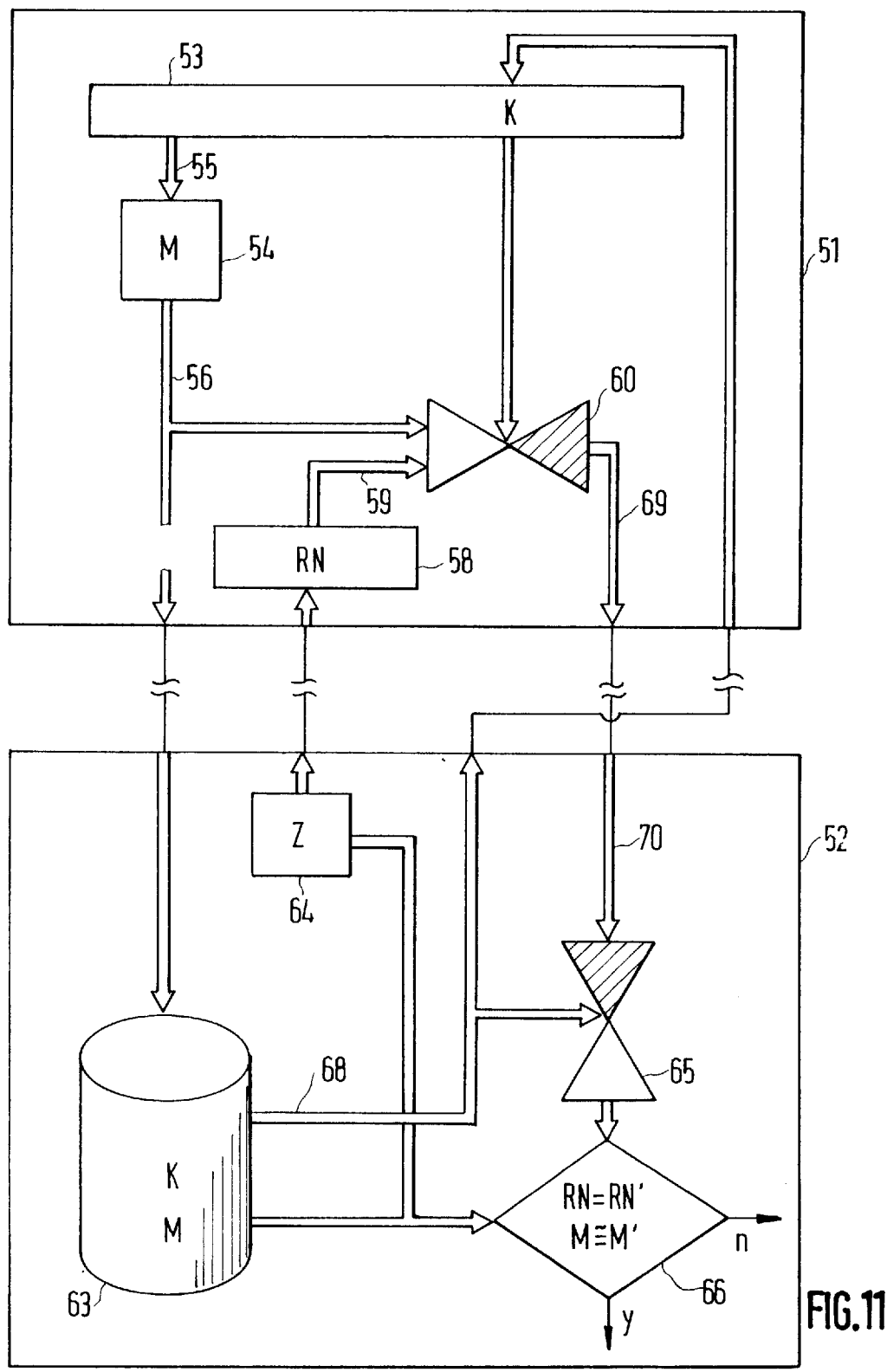
FIG. 11 shows the system components of FIG. 10 in the test phase (on-line)

FIG. 11 shows the card and the host in the card verification mode during a transaction. During this on-line verification, the card again determines the individual characteristics of memory 53 by internal measuring means 54 and transmits the data obtained therefrom to encryption unit 60. At a second input a dynamic time-variant quantity, e.g. a random number RN generated by random number generator 64 in the host, which can be stored temporarily in register 58, is available for encryption via line 59. Instead of a random number, one can also include in the encryption the time of day or the transaction data as a constantly varying quantity. The encryption takes place in unit 60 using stored key K and the encryption result is transmitted via line 69–70 to decryption unit 65 in the host and decrypted there with key K or using an asymmetrical algorithm having an appropriate key counterpart K'. Characteristics M' obtained therefrom are then tested for identity or similarity with stored characteristics M. By comparing the decrypted random number with the random number generated by the host one can test the system affiliation, i.e. ascertain whether the card disposes of correct key K. Should this test show that there is identity in terms of the random number but that characteristics M are incorrect, i.e. the host has other characteristics M stored than the user data in question, this card is either a duplicate or it was provided with incorrect user data. In the former case, that of duplication, an imitated card is loaded with the user data and further data of an authentic and valid card. Since the imitated card has a different circuit with individual characteristics deviating from the authentic card, however, such a duplicate is recognized as such due to the different characteristics.

In the second case the user data in an authentic permissible card are replaced so that e.g. third-party accounts are debited. Even if the fraud has for example, equipped his card with the data of a permissible user, this manipulation is recognized since the comparison between user data and characteristics will also be negative in this case.

The authenticity testing via an on-line connection can also be performed with the aid of a public key algorithm, whereby card 51 is preferably provided with the public key and the host retains the corresponding secret key in its memory. Thus, every card can encrypt its internally determined characteristics with this public key and only the host can decrypt the characteristics again with the aid of the secret key and compare them with the data stored there, as described above.

The random number transmitted by the host can, in a variation, also be used to select the E$^2$PROM cells to be evaluated. For this purpose the memory area intended for determining the characteristics, which can include one or more memory rows with eight memory cells each, is erased so that all memory cells of this area assume the same logical value, e.g. "0". The random number RN existing in binary form (e.g. 01100101) is loaded into this memory row or these memory rows, whereby the programming times of the cells to be reloaded in each memory row are registered (in the present example these are the second, third, sixth and eighth cells). These times are then transmitted to the host in encrypted form as individual characteristics. The host, which has the programming times of all memory cells stored, compares the stored times with the transmitted times of those cells which were reprogrammed in accordance with the random number.

Thus, even the individual characteristics are different from transaction to transaction, which makes the system even more opaque to outsiders and more inaccessible to manipulation.

In some cases, e.g. with credit cards, it is not absolutely necessary to verify the authenticity of the card via the host immediately during the transaction. It suffices to test later, e.g. during clearing, whether an authentic registered card was presented during this transaction. In this case the card is only used during the transaction to encrypt internally the characteristics with the transaction data inputted to the card (purchase money, date, consecutive number, etc.). The resulting encryption result is noted on the sales voucher or, in the case of electronic sales handling, added to the transaction data set. As needed or during clearing, the host can then at any time ascertain the correctness of the data and, in the case of discrepancies, unambiguously clear up whether an authentic card or a forgery was used for this or that transaction.

For inputting the transaction data or outputting the encrypted data, the card can be inserted into an appropriate terminal having a data entry keyboard and a display, or itself be equipped with a keyboard and a display.

The card can also be used additionally or exclusively for off-line verification.

Figure 12:
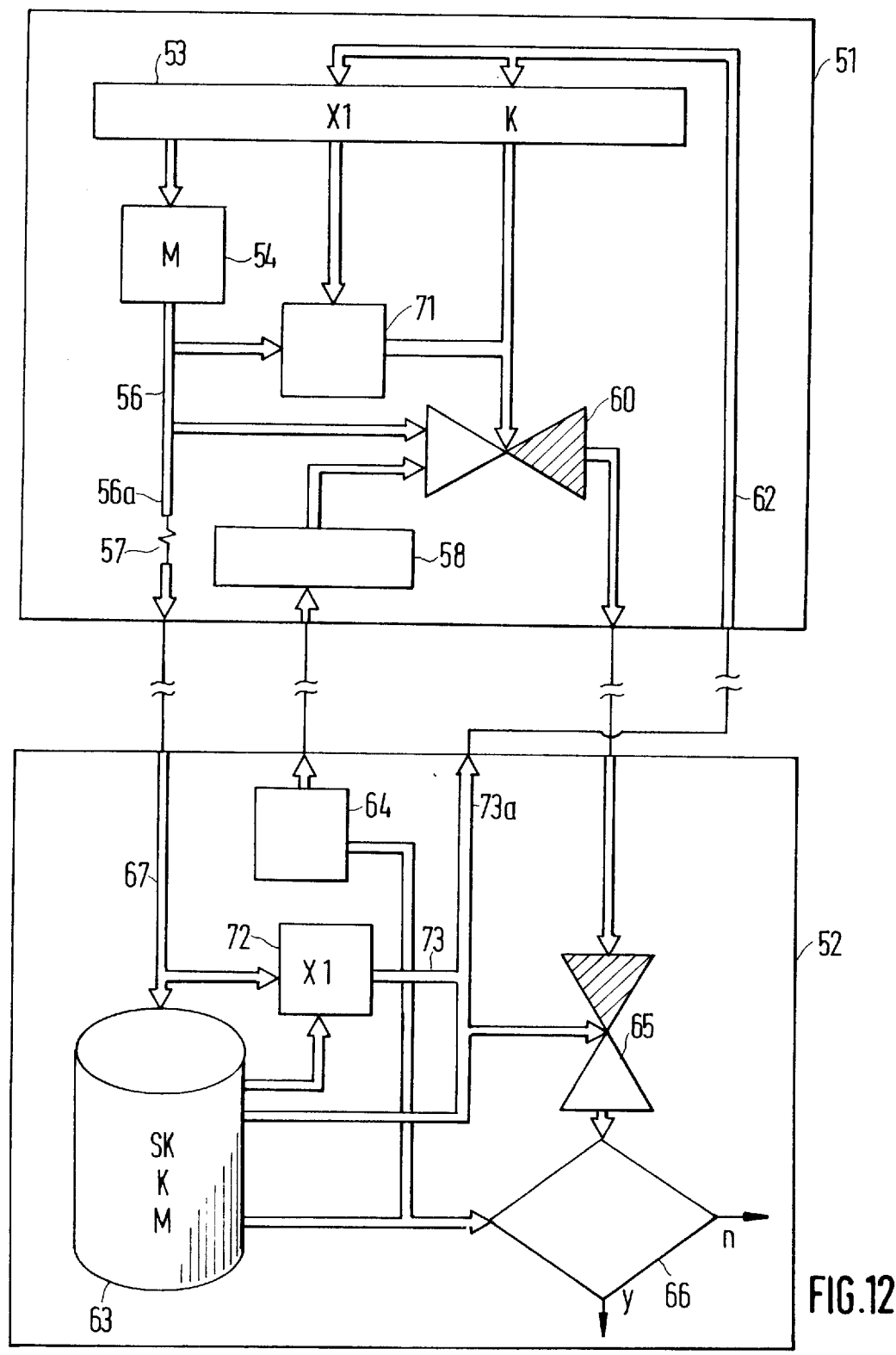
FIG. 12 shows a schematic view of the inventive system components, card and mainframe, in the initialization phase for on-/off-line authenticity testing.

FIG. 12 shows, again very schematically, a card and the host in the initialization phase during which the card is equipped with the appropriate keys both for off-line testing and for on-line testing. For this purpose, card 51 contains not only memory 53, internal measuring means 54, encryption unit 60 and register 58 but also an additional unit 71 which, as shall be explained below, is used for generating a key. The host also disposes of such a unit 72 for key generation.

In the initialization phase, individual characteristics M are determined by the internal measuring means in the card and transmitted via lines 56, 56a and 67 to the main memory of the host. In addition these characteristics are Inputted here into key generating unit 72 of the host. In this unit, an offset X1 is determined, starting with a preset key $S_K$, in such a way that preset key $S_K$ can be determined again in combination with the characteristics. Although characteristics M are naturally different from card to card, the cards can be designed with the help of this offset in such a way that the preset uniform key $S_K$ is internally generated in each case. This offset X1 is entered into memory 53 of card 51 from key forming unit 72 via lines 73-73a-62.

In particular in the case of off-line verification it is advantageous to use a public key algorithm, whereby in this case secret key $S_K$ is generated in the card with the help of quantities M and X1. Public key PK corresponding to the secret key is then stored in the terminals of the sales or transaction agencies.

The described key generation can be used to test a great number of cards for authenticity with only one key, which considerably reduces the memory required in the terminals of the off-line system and simplifies the key management and distribution.

In addition, the card can also be loaded with a key K which is then used in on-line verification, as shown in FIG. 10 or 11.

Figure 13:
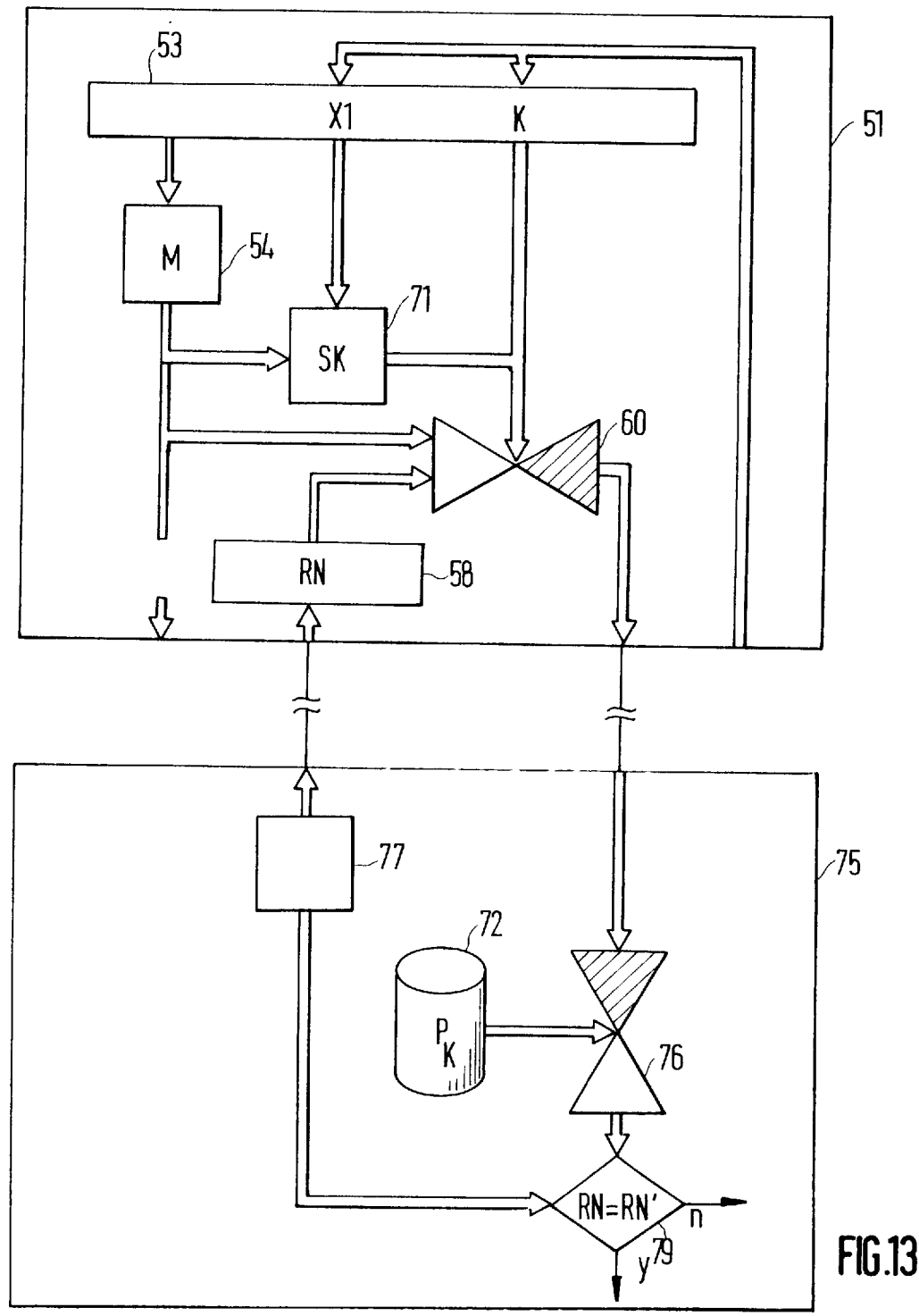
FIG. 13 shows the system components, card and terminal, in the off-line test phase.

FIG. 13 shows schematically a card 51 and a terminal 75 with the means necessary for off-line verification of the card. At every transaction or use of the card the individual characteristics are determined internally and fed after processing and pretesting to key forming unit 71 of the card. In parallel therewith, offset X1 is read out of memory 53 and then yields in combination with characteristics M the secret key $S_K$ which is uniform for all cards of a certain group. This key $S_K$ is then used in encryption unit 60 to encrypt a random number RN generated by the terminal or elsewhere, whereupon this encrypted random number is transmitted to the terminal. In terminal 75 the transmitted data are then decrypted in unit 76 with the aid of the public key stored in a memory 78, and compared in a comparator 79 with the random number generated in random number generator 77. The identity or these data confirms the authenticity of the card.

Compared to known authenticity testing methods, which use only electronically stored key data to encrypt the random number, this method has the advantage that the key is only present in the card temporarily, namely from the time of key formation to the end of encryption. Otherwise, only the offset is stored electronically in the card, the knowledge of which alone does not suffice for determining the secret key.

Since the characteristics are used in this method as key input data, one must make sure, as already mentioned at the outset, that these characteristics exist in an identical form in each key formation. This identity can be obtained, for example, by entering in the memory additional check digits which allow for correction and testing of the measured and processed characteristics, as the occasion arises.

Figure 14:
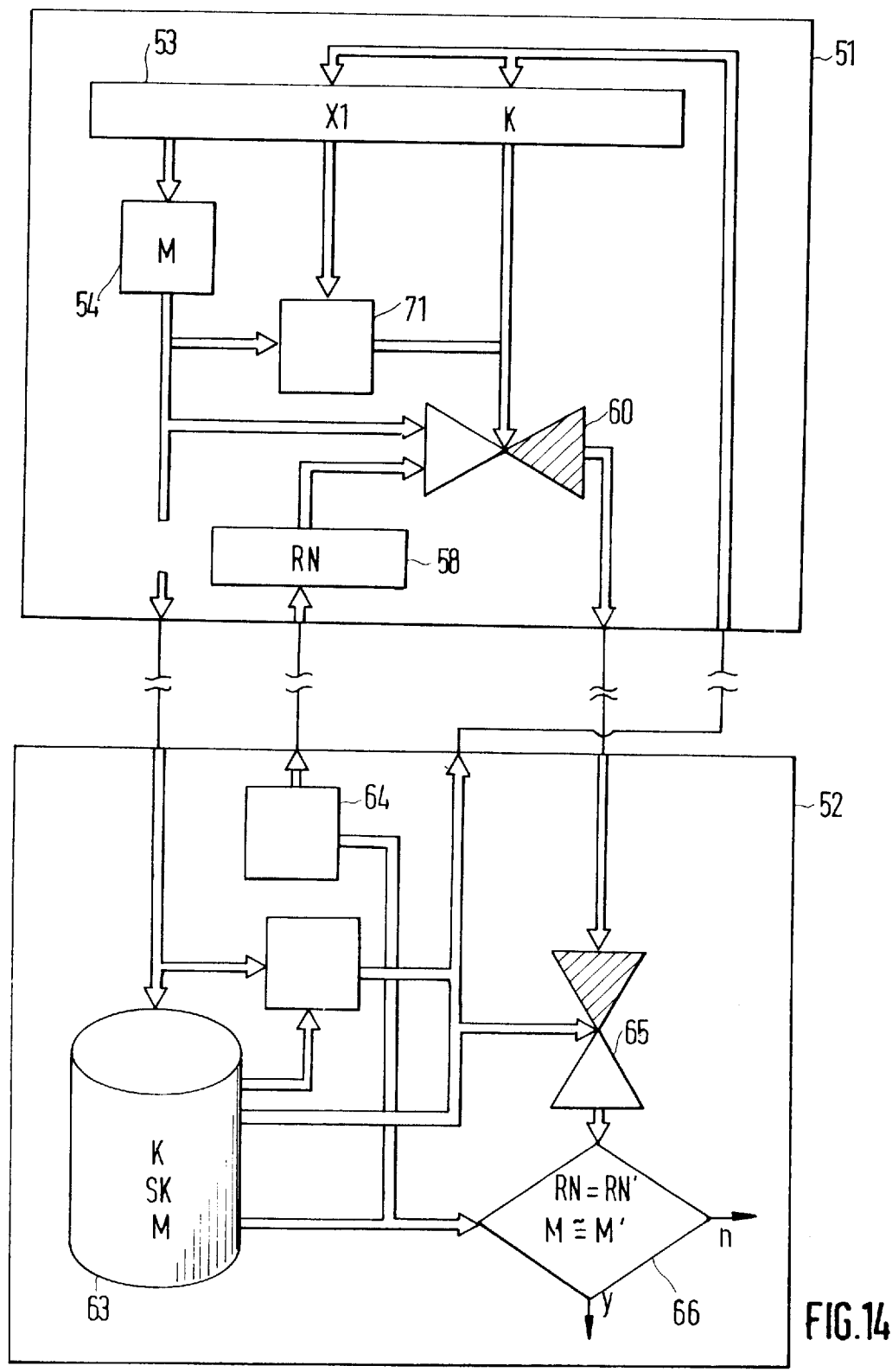
FIG. 14 shows the system components, card and mainframe, in the on-line test phase.

Should a change occur in the individual characteristics that can no longer be corrected with these correction means, the same card can be subjected to on-line testing, whereby the characteristics are again, as shown in FIG. 14, input data for encryption, possibly together with a variable quantity. This variable quantity can again be a random number which is generated in a random number generator 64 in the host and transmitted to the card via register 58.

Characteristics M and this random number RN are then encrypted in encryption unit 60 with key K stored during initialization, and transmitted to host 52. The host decrypts these data with same key K available to it or a key corresponding thereto, thereby recovering the characteristics and this random number in clear text.

The characteristics can then be tested for identity with the characteristics stored in the host, whereby one can ascertain unambiguously to what extent the decrypted characteristics deviate from the data stored during initialization. Depending on the extent of this deviation, the card can be classified as authentic or as a duplicate or forgery. If the transmitted characteristics are sufficient for affirming authenticity but not sufficient for forming the secret key in the required form in reproducible fashion with inclusion of the offset, a new offset can be calculated in the host taking the changed characteristics into consideration, and this new offset be transmitted to the card to be stored in memory 53 thereof.

It proves to be particularly advantageous in the described methods that a great variety of different tasks can be solved very flexibly in conjunction with the inventive authenticity testing of the circuit of the chip card. As explained in the examples and required depending on the application, there is the possibility of either on-line or off-line authenticity verification. In practice these two possibilities can be used, for example, by subjecting transactions to on-line testing only as of a certain transaction value and/or only in the case of particularly suspicious factors. In this way one can adapt the number of on-line authenticity testings in graded fashion to the individual case, thereby reducing them to a minimum. In strictly off-line systems, however, it is also ensured that neither card duplicates nor falsified card data compromise the system.

In the production process or the cards a "graded security" can be realized in the same way. for example, by using only a transport code common to all cards of a batch or a type of card instead of the individual card feature "M" in the less endangered method steps. This transport code known as such from chip card technology, which also prevents unauthorized use but without individual authenticity testing, allows for easier and faster handling in the area of the chip and card manufacturer. Only during card personalization is the transport code erased and replaced by the unique information "M", so that as of this time every single chip or chip card is genuinely individualized. This measure not only increases the possibility of authenticity testing but additionally separates the phases "card production" and "card use" clearly from each other, so that the test devices and their software required during card production are also protected from abuse on the user level.

Since the unique information "M" is accessible only to a limited extent, if at all, but can by no means be changed on the test device level, it is ensured that the individualization of the chip or the card is unambiguous and cannot be manipulated. Data changes and chip duplicates are already recognized clearly on the lowest security level (off-line).

Since the testing of the card feature "M" takes place on-chip, no special sensors are required for this in the card test devices. The hardware required in the system is therefore of simpler construction in spite of higher security.

The authenticity testing is based according to the invention on individual properties of the chip. When using $E^2PROM$ memories one can use any memory cells in terms of their loading times. Since the memory cells used for this purpose must be defined in advance but can basically be selected quite freely, an outsider cannot reconstruct which elements of the memory are to be considered in what way. One thus obtains an optimal camouflage of the unique information. Due to the use of chip-inherent properties it is also unnecessary to use a special generator for generating such information.

If one uses for the card authenticity testing a data set comprising two pieces of information, one piece being based on chip tolerances (unique information "M") and the other being deliberately generated and stored as a so-called "offset", the two pieces of information exist in different physical forms, so that different technologies are also required for spying out the entire data set. This further impedes access to the entire information. If one uses the individuality of the $E^2PROM$ memory cells, the offset can also be written directly into the memory cells used for the unique information "M", and read out successively during the authenticity testing so that both pieces of information are present in one memory separated from each other. This embodiment, in which the pieces of information are "read out" successively during testing, allows for particularly high packing density of the information and allows for further camouflage of the authenticity information.

The basic idea of the invention allows for a great number of modifications and combinations. The concept is particularly unforgeable, however, if one makes sure that the information characterizing the "chip property" cannot be read out of the card in clear text in the user phase and a secret key SK provided in the chip actually remains secret, i.e. is not accessible from the outside.

If the encryption logic necessary for the authenticity testing is realized in the chip in terms of hardware (hard-wired logic), one obtains not only a very compact construction but also the advantage that no encryption information reaches the internal data bus of the chip, thereby preventing encryption processes from being tapped. In this embodiment, in which the data handling takes place in serial fashion, analysis of the operations is necessarily impaired additionally.

Understandably, the described authenticity testing method is not restricted to authenticity testing of the chip or chip card. If the card is used in a security system, the correct communication between the terminal and the chip logic in an on-line method can also be used for authenticity identification of the terminal, etc.

It is even possible to use the authenticity testing in conjunction with memory cards proper, as used nowadays e.g. as telephone cards in public telephone networks. In this case the card numbers and authenticity information M are stored in a central list. This information is fetched from the card during the card during the transaction (account number) or determined via a measuring means located in the transaction terminal (telephone apparatus with card reader) and compared with the central data. In such an embodiment one must merely ensure that the card readers integrated into the telephone apparatus are safe from the access or third parties, i.e. the equipment hardware can be regarded as a protected system. In this case there is little point in intercepting the information on the data line and this does not endanger the system in any way. This is particularly true when services are involved as the equivalent, and the values of the individual transactions (telephone calls) do not justify increased effort on the part of the forger. The authenticity testing of the memory cards ensures in such a system in any case that card duplicates are recognized beyond any doubt, and illicitly personalized authentic cards cannot be used in the system either, so that such measures ensure that only regular authentic cards can be used.

I claim:

1. A method for testing the authenticity of a data storage carrier having at least on integrated circuit including memory and logic means as well as elements for imputing and outputting data, comprising:

detecting a physical property possessed solely be said at least one integrated circuit; and evaluating said physical property of said circuit for an individual feature characterizing said at least one integrated circuit so as to determine the authenticity of said at least one integrated circuit, said evaluating step comprising comparing said individual feature with a previously stored characteristic value; wherein the authenticity of the at least one integrated circuit determines the authenticity of the data storage carrier.

2. The method of claim 1, wherein predetermined physical structures deliberately produced during manufacture of the chip are evaluated as individual properties characteristic of the circuit.

3. The method of claim 2, wherein said deliberately produced structures comprise electrically conductive coatings with a random surface structure capable of being scanned via a resistance measurement.

4. The method of claim 1, wherein:

said previously stored characteristic value comprises previously detected programming times for said individual memory cells, said previously detected programming times being stored in a remote host;

said step of detecting comprises writing a random number into said individual memory cells, determining said programming times required for writing said random number, and transmitting said programming times to said remote host in encrypted form; and said step of evaluating comprises comparing said programming times with said previously detected programming times, so that when said programming times match said previously detected programming times, said data storage carrier is determined to be authentic, while when said programming times do not match said previously detected programming times, said data storage carrier is determined to be unauthentic.

5. The method of claim 1, wherein said individual characteristic is a characteristic caused by a manufacturing tolerance of said at least one integrated circuit, so that said individual characteristic cannot be duplicated by a different integrated circuit.

6. The method for testing the authenticity of a data storage carrier of claim 1, wherein said evaluated features vary randomly from circuit to circuit due to tolerances of process technology during production of the integrated circuit and/or material-related tolerances.

7. The method of claim 6, wherein input characteristics of said integrated circuit are evaluated as a distinctive feature thereof.

8. The method of claim 7, wherein data from said characteristics are evaluated which come directly from a breakdown area or from the vicinity thereof of said input characteristic of said circuit.

9. The method of claim 6, wherein the physical surface structure of the integrated circuit is scanned and evaluated as an individual distinctive feature.

10. The method of claim 9, wherein an unpolished side of the integrated circuit whose shape was affected by the sawing process is scanned.

11. The method for testing the authenticity of the data storage carrier of claim 6, whereby said memory means comprises $E^2$PROM memories, wherein programming times, differing for individual memory cells of said $E^2$PROM memories are used as a feature distinctive of the circuit.

12. The method of claim 11, wherein a data group preferably in the form of one or more memory rows is selected for data evaluation from the memory cells of a memory array.

13. The method of claim 12, wherein selection of the memory cells to be evaluated is random.

14. The method of claim 13, wherein the programming time required for reprogramming said memory cells over a predetermined time period is divided into a sequence of brief time clocks and the programming process thus takes place in clocked fashion and the memory content of the memory cells to be evaluated is read out in the programming intervals between two clocks.

15. The method of claim 13, wherein a programming time is selected for reprogramming memory cells of a selected memory row which time is insufficient for reprogramming all memory cells of said row, the content of the memory row after this shortened programming time serving to characterize said integrated circuit.

16. The method of claim 12, wherein selection of the memory cells to be evaluated is made according to a predetermined rule.

17. The method of claim 16, wherein the programming said time required for reprogramming memory cells over a predetermined time period is divided into a sequence of brief time clocks and the programming process thus takes place in clocked fashion and the memory content of the memory cells to be evaluated is read out in the programming intervals between two clocks.

18. The method of claim 16, wherein a programming time is selected for reprogramming memory cells of a selected memory row which time is insufficient for reprogramming all memory cells of said row, the content of the memory row after this shortened programming time serving to characterize said integrated circuit.

19. The method of claim 12, wherein the programming said time required for reprogramming memory cells over a predetermined time period is divided into a sequence of brief time clocks and the programming process thus takes place in clocked fashion and the memory content of the memory cells to be evaluated is read out in the programming intervals between two clocks.

20. The method of claim 12, wherein a programming time is selected for reprogramming memory cells of a selected memory row which time is insufficient for reprogramming all memory cells of said row, the content of the memory row after this shortened programming time serving to characterize said integrated circuit.

21. The method of claim 11, wherein the programming time required for reprogramming the memory cells over a predetermined time period is divided into a sequence of brief time periods and the programming process thus takes place in a clocked fashion and the memory content of the memory cells to be evaluated is read out in the programming intervals between two clocks time periods.

22. The method of claim 21, wherein the chronological order of the reprogramming process for the individual cells of each memory row to be evaluated is stored to characterize an integrated circuit.

23. The method of claim 22, wherein the skew time between the reprogramming processes of two successive rows is additionally stored as a further characteristic.

24. The method of claim 21, wherein the data of memory cells of one or more memory rows which have almost the same programming time are stored as characteristics.

25. The method of claim 11, wherein a programming time is selected for reprogramming the memory cells of a memory row which is insufficient for reprogramming all memory cells of said row; the content of the memory row remaining after this shortened programming time serves to characterize the integrated circuit.

26. The method of claim 25, wherein during said readout of said memory cell the reading voltage is varied in order to determine those memory cells which are just in the cutoff area of the reprogramming process after said shortened programming time.

27. A data storage carrier comprising:
   at least one integrated circuit with memory and logic means as well as elements for inputting and outputting data; and
   measuring means for determining a distinctive physical property of said at least one integrated circuit, said distinctive property being specific to said at least one integrated circuit and differing between said at least one integrated circuit and at least one other circuit of a same type and a same function as said at least one integrated circuit, said distinctive property used for creating individual characteristics (M) for said at least one integrated circuit; wherein the individual characteristics (M) are used to verify the authenticity of the data storage carrier.

28. The date carrier of claim 27, wherein said data storage carrier comprises a microprocessor.

29. A system for testing the authenticity of the data storage carrier of claim 28, wherein in an initialization phase
   the measuring means (54) determines the individual characteristics (M) of the integrated circuit,
   said characteristics (M) are fetched from the data carrier (51) and stored in a protected environment (63) outside the data carrier after said initialization phase, the output of said characteristics (M) is irreversibly prevented via means (57) provided in the data carrier, and data (K), serving as a data key, is stored in the memory (53) of the data storage carrier, during the authenticity testing of the data carrier said characteristics (M) are determined internally in said data storage carrier, said characteristics are encrypted with said stored key (K), and the encryption result is fetched from said data storage carrier, decrypted in the host (52), and compared with data stored therein.

30. A system for testing the authenticity of the data storage carrier of claim 28, wherein in the initialization phase said measuring means (54) determines said individual characteristics (M), said characteristics (M) are fetched from outside said carrier via an outgoing line (56, 56a), for said characteristics (M) a quantity (offset X1) is determined using a preset key ($S_K$), said offset (X1) deposited in a memory (53) in said data storage carrier (51), said characteristics linked with said offset key forming unit (71) contained in the data carrier in order to form said preset key ($S_K$), said ($S_K$) used for encrypting data (RX) made available externally and/or internally of said carrier, the encryption result is fetched from said data storage carrier, and the fetched data are decrypted again and tested for correspondence with the data made available for encryption.

31. The data storage carrier of claim 28, wherein said data carrier comprises means (60) for encrypting data.

32. The data storage carrier of claim 31, wherein said data carrier comprises a means (71) for data key formation from the data obtained from the measuring means (54).

33. A system for testing the authenticity of the data storage carrier of claim 32, wherein in an initialization phase the measuring means (54) determines the individual characteristics (M) of the integrated circuit, said characteristics (M) are fetched from the data carrier (51) and stored in a protected environment (63) outside the data carrier after said initialization phase, the output of said characteristics (M) is irreversibly prevented via means (57) provided in the data carrier, and data (K), serving as a data key, is stored in the memory (53) of the data storage carrier, during the authenticity testing of the data carrier said characteristics (M) are determined internally in said data storage carrier, said characteristics are encrypted with said stored key (K), and the encryption result is fetched from said data storage carrier, decrypted in the host (52), and compared with the data stored therein.

34. A system for testing the authenticity of the data storage carrier of claim 32, wherein in the initialization phase said measuring means (54) determines said individual characteristics (M), said characteristics (M) are fetched from outside said carrier via an outgoing line (56, 56a), for said characteristics (M) a quantity (offset X1) is determined using a preset key ($S_K$), said offset (X1) deposited in a memory (53) in said data storage carrier (51), said characteristics linked with said offset key forming unit (71) contained in the data carrier in order to form said preset key ($S_K$), said ($S_K$) used for encrypting data (RX) made available externally and/or internally of said carrier, the encryption result is fetched from said data storage carrier, and the fetched data are decrypted again and tested for correspondence with the data made available for encryption.

35. A system for testing the authenticity of the data storage carrier of claim 31, wherein in an initialization phase the measuring means (54) determines the individual characteristics (M) of the integrated circuit, said characteristics (M) are fetched from the data carrier (51) and stored in a protected environment (63) outside the data carrier after said initialization phase, the output of said characteristics (M) is irreversibly prevented via means (57) provided in the data carrier, and data (K), serving as a data key, is stored in the memory (53) of the data storage carrier, during the authenticity testing of the data carrier said characteristics (M) are determined internally in said data storage carrier, said characteristics are encrypted with said stored key (K), and the encryption result is fetched from said data storage carrier, decrypted in the host (52), and compared with the data stored therein.

36. A system for testing the authenticity of the data storage carrier of claim 31, wherein in the initialization phase said measuring means (54) determines said individual characteristics (M), said characteristics (M) are fetched from outside said carrier via an outgoing line (56, 56a), for said characteristics (M) a quantity (offset X1) is determined using a preset key ($S_K$), said offset (X1) deposited in a memory (53) in said data storage carrier (51), said characteristics linked with said offset key forming unit (71) contained in the data carrier in order to form said preset key ($S_K$), said ($S_K$) used for encrypting data (RX) made available externally and/or internally of said carrier, the encryption result is fetched from said data storage carrier, and the fetched data are decrypted again and tested for correspondence with the data made available for encryption.

37. The data carrier of claim 27, wherein said measuring means (54) evaluates distinctive properties of said integrated circuit which vary from circuit to circuit due to tolerances of process technology during manufacture of the integrated circuit and/or material-induced tolerances.

38. The data carrier of claim 37, wherein said measuring means (53) comprises $E^2$PROM memories wherein said measuring means (54) determines the different programming times of individual memory cells.

39. A system for testing the authenticity of the data storage carrier of claim 38, wherein in an initialization phase the measuring means (54) determines the individual characteristics (M) of the integrated circuit, said characteristics (M) are fetched from the data carrier (51) and stored in a protected environment (63) outside the data carrier after said initialization phase, the output of said characteristics (M) is irreversibly prevented via means (57) provided in the data carrier, and data (K), serving as a data key, is stored in the memory (53) of the data storage carrier, during the authenticity testing of the data carrier said characteristics (M) are determined internally in said data storage carrier, said characteristics are encrypted with said stored key (K), and the encryption result is fetched from said data storage carrier, decrypted in the host (52), and compared with the data stored therein.

40. A system for testing the authenticity of the data storage carrier of claim 38, wherein in the initialization phase said measuring means (54) determines said individual characteristics (M), said characteristics (M) are fetched from outside said carrier via an outgoing line (56, 56a), for said characteristics (M) a quantity (offset X1) is determined using a preset key ($S_K$), said offset (X1) deposited in a memory (53) in said data storage carrier (51), said characteristics linked with said offset key forming unit (71) contained in the data carrier in order to form said preset key ($S_K$), said ($S_K$) used for encrypting data (RX) made available externally and/or internally of said carrier, the encryption result is fetched from said data storage carrier, and the fetched data are decrypted again and tested for correspondence with the data made available for encryption.

41. A system for testing the authenticity of the data storage carrier of claim 37, wherein in an initialization phase the measuring means (54) determines the individual characteristics (M) of the integrated circuit, said characteristics (M) are fetched from the data carrier (51) and stored in a protected environment (63) outside the data carrier after said initialization phase, the output of said characteristics (M) is irreversibly prevented via means (57) provided in the data carrier, and data (K), serving as a data key, is stored in the memory (53) of the data storage carrier, during the authenticity testing of the data carrier said characteristics (M) are determined internally in said data storage carriers, said characteristics are encrypted with said stored key (K), and the encryption result is fetched from said data storage carrier, decrypted in the host (52), and compared with the data stored therein.

42. A system for testing the authenticity of the data storage carrier of claim 37, wherein in the initialization phase said measuring means (54) determines said individual characteristics (M), said characteristics (M) are fetched from outside said carrier via an outgoing line (56, 56a), for said characteristics (M) a quantity (offset X1) is determined using a preset key ($S_K$), said offset (X1) deposited in a memory (53) in said data storage carrier (51), said characteristics linked with said offset key forming unit (71) contained in the data carrier in order to form said preset key ($S_K$), said ($S_K$) used for encrypting data (RX) made available externally and/or internally of said carrier, the encryption result is fetched from said data storage carrier, and the fetched data are decrypted again and tested for correspondence with the data made available for encryption.

43. The system for testing the authenticity of a data storage carrier of claim 27, wherein in an initialization phase measuring means (54) determines individual characteristics (M) of the integrated circuit, said characteristics (M) are fetched from the data carrier (51) and stored in a protected environment (63) outside the data carrier after said initialization phase, the output of said characteristics (M) is irreversibly prevented via means (57) provided in the data carrier, and data (K), serving as a data key, is stored in the memory means (53) of the data storage carrier during authenticity testing of the data carrier, said characteristics (M) are determined internally in said data storage carrier, said characteristics are encrypted with said stored data key (K), and the encryption result is fetched from said data storage carrier, decrypted in a host (52), and compared with data stored therein.

44. The authenticity testing system of claim 43, wherein a quantity (RN) varying from transaction to transaction is included in said encryption of said characteristics (M).

45. The authenticity testing system of claim 44, wherein a variable quantity (RN) is used for the determination of the individual characteristics (M), during the selection determination of the particular $E^2PROM$ memory cells to be evaluated.

46. The authenticity testing system of claim 44, wherein said testing of the authenticity of a data carrier takes place in a remote host (52) on-line via remote data transmission means.

47. The authenticity testing system of claim 44, wherein the encryption result determined in said data storage carrier is temporarily stored e.g. in a data terminal or on a different data storage carrier (sales voucher, etc.) to be decrypted and tested for correctness at a later time.

48. The authenticity testing system of claim 43, wherein said testing of the authenticity of a data storage carrier takes place in a remote host (52) on-line via remote data transmission means.

49. The authenticity testing system of claim 43, wherein the encryption result determined in said data storage carrier is temporarily stored in a data terminal or on a different data storage carrier (sales voucher, etc.) in order to be decrypted and tested for correctness at a later time.

50. The authenticity testing system of claim 43, wherein the symmetrical key algorithms (DES) are used.

51. The authenticity testing system of claim 43, wherein the asymmetrical key algorithms (public key, RSA) are used, whereby said public key is stored in the data carrier.

52. A system for testing the authenticity of the data storage carrier of claim 27, wherein in an initialization phase said measuring means (54) determines said individual characteristics (M), said characteristics (M) are fetched from outside said carrier via an outgoing line (56, 56a), for said characteristics (M) a quantity (offset X1) is determined using a preset key ($S_K$), an offset (X1) is deposited in a memory (53) in said data storage carrier (51), said characteristics are linked with an offset key forming unit (71) contained in the data carrier in order to form said preset key ($S_K$), said key ($S_K$) used for encrypting data (RX) made available externally and/or internally of said carrier, the encryption result is fetched from said data storage carrier, the fetched data are decrypted again and tested for correspondence with data made available for encryption.

53. The authenticity testing system of claim 52, wherein a numerical quantity (RN) varying from transaction to transaction, e.g. a random number, is used for said encryption.

54. The authenticity testing system of claim 53, wherein said asymmetrical encryption algorithm (public key) is applied using a key ($S_K$) to be kept secret by a user, and a key ($P_K$) that may be publicly accessible.

55. The authenticity testing system of claim 52, wherein an asymmetrical encryption algorithm (public key) is applied using a key ($S_K$) to be kept secret by a user and another key ($P_K$) that may be publicly accessible.

56. The authenticity testing system of claim 55, wherein said secret key ($S_K$) is formed in the data carrier and said decryption of said data takes place outside said data storage carrier with said public key ($P_K$).

57. The authenticity testing system of claim 52, wherein in said initialization phase a further data key (K) is additionally loaded into said memory (53) of said data storage carrier, said characteristics (M) are stored outside said data storage carrier in a protected environment (63), and the authenticity testing also takes place on-line using said further key, (K) and encryption of the characteristics (M) are determined by the measuring means (54).

58. The data storage carrier of claim 27, wherein:

said at least one integrated circuit comprises an $E^2$PROM having a plurality of memory cells; and said measuring means comprises means for receiving a random number from a remote host, writing said random number into said plurality of memory cells, determining programming times required for writing said random number into said plurality of memory cells, and transmitting said programming times to said remote host in encrypted form.

59. The data storage carrier of claim 27, wherein said distinctive physical property is caused by a manufacturing tolerance of said at least one integrated circuit, so that said distinctive physical property cannot be duplicated by a different integrated circuit.

60. A method for testing the authenticity of a data storage carrier including an integrated circuit, said method comprising:

initially detecting a physical property of an authentic integrated circuit peculiar to said authentic integrated circuit and storing a first value representative of said physical property of said authentic integrated circuit;

detecting said physical property of an integrated circuit assumed to be said authentic integrated circuit and generating a second value representative of said physical property of said integrated circuit assumed to be said authentic integrated circuit; and comparing said first value to said second value so assumed to be said authentic integrated circuit; wherein the authenticity of the integrated circuit assumed to be the authentic integrated circuit determines the authenticity of the data storage carrier.

61. The method of claim 60, wherein:

said integrated circuit comprises an $E^2$PROM having a plurality of memory cells;

said step of initially detecting comprises detecting a first set of programming times for said memory cells, said first set of programming times being stored in a remote host;

said step of detecting comprises writing a random number into said memory cells, determining a second set of programming times required for writing said random number, and transmitting said second set of programming times to said remote host in encrypted form; and said step of comparing comprises comparing said first and second sets of programming times, so that when said first and second sets of programming times match, said data storage carrier is determined to be authentic, while when said first and second sets of programming times do not match, said data storage carrier is determined to be unauthentic.

62. The method of claim 60, wherein said physical property is caused by a manufacturing tolerance of said integrated circuit, so that said physical property cannot be duplicated by a different integrated circuit.

* * * * *